(12) United States Patent
Tsuruta et al.

(10) Patent No.: US 11,514,390 B2
(45) Date of Patent: Nov. 29, 2022

(54) DELIVERY SYSTEM AND PROCESSING SERVER

(71) Applicant: TOYOTA JIDOSHA KABUSHIKI KAISHA, Toyota (JP)

(72) Inventors: Ayano Tsuruta, Toyota (JP); Yasuhiro Hara, Nagoya (JP); Junya Watanabe, Nagakute (JP); Kenta Miyahara, Toyota (JP); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 504 days.

(21) Appl. No.: 16/668,203

(22) Filed: Oct. 30, 2019

(65) Prior Publication Data
US 2020/0175468 A1 Jun. 4, 2020

(30) Foreign Application Priority Data

Nov. 29, 2018 (JP) .............................. JP2018-224176

(51) Int. Cl.
| | | |
|---|---|---|
| *B64C 39/02* | (2006.01) | |
| *G05D 1/00* | (2006.01) | |
| *G05D 1/10* | (2006.01) | |
| *G06Q 10/08* | (2012.01) | |

(52) U.S. Cl.
CPC ....... *G06Q 10/0832* (2013.01); *B64C 39/024* (2013.01); *G05D 1/102* (2013.01); *B64C 2201/128* (2013.01); *B64C 2201/208* (2013.01)

(58) Field of Classification Search
CPC ............. G06Q 10/0832; G06Q 10/083; G06Q 10/0833; G06Q 10/00; B64C 39/024; B64C 2201/128; B64C 2201/208; B64C 2201/141; B64C 39/02; B64C 2201/108; G05D 1/102; G05D 1/00; B64D 1/00; B64D 1/02; B64D 1/22
See application file for complete search history.

(56) References Cited

U.S. PATENT DOCUMENTS

| | | | |
|---|---|---|---|
| 10,783,478 B2 * | 9/2020 | Studnicka | .......... G06Q 20/4015 |
| 2016/0185466 A1 | 6/2016 | Dreano, Jr. | |
| 2016/0257401 A1 | 9/2016 | Buchmueller et al. | |
| 2018/0024554 A1 | 1/2018 | Brady et al. | |
| 2018/0037322 A1 | 2/2018 | Buchmueller et al. | |
| 2018/0129981 A1 | 5/2018 | Fujimoto | |

(Continued)

FOREIGN PATENT DOCUMENTS

| | | |
|---|---|---|
| JP | 2016-153337 A | 8/2016 |
| JP | 2017-144778 A | 8/2017 |

(Continued)

*Primary Examiner* — Yonel Beaulieu
(74) *Attorney, Agent, or Firm* — Sughrue Mion, PLLC

(57) ABSTRACT

A delivery system including a vehicle in which a package addressed to a specific user is stored, and a moving body deployed at a delivery site of the package: the moving body including: a first memory, and a first processor that is connected to the first memory; and the first processor being configured to: transmit and receive predetermined information, and perform control, in a case in which the vehicle is proximate to the delivery site, to move the moving body from the delivery site toward the vehicle, to retrieve the package, and then to move the moving body back to the delivery site.

13 Claims, 18 Drawing Sheets

(56) References Cited

U.S. PATENT DOCUMENTS

| | | | |
|---|---|---|---|
| 2018/0203465 A1 | 7/2018 | Suzuki | |
| 2018/0290731 A1 | 10/2018 | Ishibashi | |
| 2020/0207474 A1* | 7/2020 | Foggia | B64C 39/024 |
| 2020/0364663 A1* | 11/2020 | Colella | G01C 21/20 |
| 2021/0201619 A1* | 7/2021 | Clarke | B60P 3/007 |

FOREIGN PATENT DOCUMENTS

| | | |
|---|---|---|
| JP | 2017-222187 A | 12/2017 |
| JP | 2018-073351 A | 5/2018 |
| JP | 2018-077652 A | 5/2018 |
| JP | 2018-513456 A | 5/2018 |
| WO | 2017/006421 A1 | 1/2017 |
| WO | 2017/110824 A1 | 6/2017 |
| WO | 2018/046124 A1 | 3/2018 |

* cited by examiner

DELIVERY SYSTEM AND PROCESSING SERVER

CROSS-REFERENCE TO RELATED APPLICATION

This application is based on and claims priority under 35 USC 119 from Japanese Patent Application No. 2018-224176 filed on Nov. 29, 2018, the disclosure of which is incorporated by reference herein.

BACKGROUND

Technical Field

The present disclosure relates to a delivery system for delivery of a package using a vehicle and a moving body, and a processing server that performs processing relating to delivery using a vehicle and a moving body.

Related Art

Japanese Patent Application Laid-Open (JP-A) No. 2016-153337 discloses a delivery system in which a package for home delivery is loaded into a vehicle (delivery vehicle) together with a drone configuring a moving body.

In this system, a roof of the delivery vehicle includes a take-off and landing space and a package departure port. The delivery vehicle also includes a means for supplying a package to the package departure port. A drone that has received a package flies to a destination address to home deliver the package. When the drone has completed home deliveries in a predetermined area, the delivery vehicle moves to another area together with the drone to make further home deliveries.

The delivery system of JP-A No. 2016-153337 assumes that the drone will be loaded onto the delivery vehicle. Although the handover of packages is straightforward in a case in which the drone is provided to the delivery vehicle, it is necessary to provide space to stow the packages and space to stow the drone in the vehicle, as well as a space for take-off and landing. This leads to constraints in the number of packages that can be loaded into the delivery vehicle.

SUMMARY

In consideration of the above circumstances, an object of the present disclosure is to provide a package-storing vehicle capable of increasing a package storage capacity in a case in which the vehicle and a moving body are employed in package delivery.

A delivery system of a first aspect includes a vehicle in which a package addressed to a specific user is stored, and a moving body deployed at a delivery site of the package. The moving body includes a communication section configured to transmit and receive predetermined information, and a retrieval control section configured to perform control, in a case in which the vehicle is proximate to the delivery site, to move the moving body from the delivery site toward the vehicle, to retrieve the package, and then to move the moving body back to the delivery site.

The delivery system of the first aspect includes the vehicle that stores the package and the moving body deployed at the delivery site. In this delivery system, the moving body retrieves the package from the vehicle and delivers the package to the delivery site in a case in which the vehicle is proximate to the delivery site. In the delivery system of the first aspect, the moving body deployed at the delivery site is configured to go to the vehicle to collect the package, thereby enabling the package storage capacity of the vehicle to be increased.

A delivery system of a second aspect is the delivery system of the first aspect, wherein the moving body includes a movement plan creation section configured to acquire delivery site information relating to the delivery site and destination information relating to a destination of the vehicle and to create a movement plan in a case in which the specific user has requested delivery of the package.

In the delivery system of the second aspect, the moving body creates the movement plan before moving, thereby suppressing unnecessary movement en route to the vehicle. The delivery system thereby enables consumption of battery power and fuel by the moving body to be suppressed.

A delivery system of a third aspect is the delivery system of the second aspect, wherein the retrieval control section is configured to move the moving body in a case in which it has been determined that the moving body will arrive at the vehicle after the vehicle has arrived at the destination set in a vicinity of the delivery site based on the movement plan.

In the delivery system of the third aspect, the moving body is made to arrive at the destination after the vehicle, thereby suppressing unnecessary waiting of the moving body. The delivery system thereby enables consumption of battery power and fuel by the moving body to be suppressed.

A delivery system of a fourth aspect is the delivery system of any one of the first aspect to the third aspect, wherein a power source of the moving body is configured to be turned on to achieve an activated state based on an activation signal received in a case in which the vehicle is proximate to the delivery site.

In the delivery system of the fourth aspect, the moving body is activated at the point in time at which the vehicle is proximate to the delivery site, thereby enabling the moving body to be moved toward the vehicle as soon as the movement instruction has been sent, enabling time loss during the delivery to be reduced.

A delivery system of a fifth aspect is the delivery system of any one of the first aspect to the fourth aspect, wherein the vehicle is an autonomous vehicle. The vehicle includes an environment detection section configured to detect surrounding environment information, and a travel plan creation section configured to create a travel plan.

In the delivery system of the fifth aspect, configuring the vehicle as an autonomous vehicle enables a reduction in the number of workers required for delivery.

A delivery system of a sixth aspect is the delivery system of the fifth aspect, wherein in a case in which there are plural delivery sites are present, the travel plan creation section is configured to create the travel plan based on respective movement distances of each of the moving body from a corresponding delivery site to the vehicle.

In the delivery system of the sixth aspect, efficient utilization of the respective moving bodies can be achieved in a case in which plural moving bodies move to the vehicle, collect packages, and return to their delivery sites.

A delivery system of a seventh aspect is the delivery system of the fifth aspect or the sixth aspect, wherein the vehicle includes a detection control section configured to allow the moving body access to the package in a case in which the environment detection section has detected the presence of the moving body around the vehicle.

In the delivery system of the seventh aspect, the moving body is able to retrieve the package from the vehicle even in a case in which the vehicle is an autonomous vehicle.

A delivery system of an eighth aspect is the delivery system of any one of the fifth aspect to the seventh aspect, wherein the moving body includes a display device that displays pre-acquired package information unique to the package. The vehicle includes a determination control section configured to allow the moving body access to the package in a case in which the package information on the display device detected by the environment detection section matches the package information unique to the package.

In the delivery system of the eighth aspect, the vehicle authenticates the moving body when the moving body retrieves the package from the vehicle, thereby enabling the package to be suppressed from being taken away by another moving body.

A delivery system of a ninth aspect is the delivery system of any one of the first aspect to the eighth aspect, wherein the vehicle includes a connection control section configured to allow the moving body access to the package. The moving body includes an imaging device configured to image identification information of the vehicle, a determination section configured to determine whether or not the identification information received in advance by the communication section matches the identification information imaged by the imaging device, and a request notification section configured to transmit request information to the vehicle to request handover of the package in a case in which the determination section has determined that the pre-received identification information and the imaged identification information match each other. The connection control section of the vehicle is configured to allow the moving body access to the package in a case in which the request information has been received.

In the delivery system of the ninth aspect, the moving body authenticates the vehicle when retrieving the package from the vehicle, thereby enabling the moving body to be suppressed from erroneously retrieving a package from another vehicle.

A delivery system of a tenth aspect is the delivery system of any one of the first aspect to the ninth aspect, wherein the moving body is a flying moving body, and the retrieval control section is configured to control the flying moving body so as to fly between the delivery site and the vehicle storing the package to be retrieved.

In the delivery system of the tenth aspect, the package can be delivered without being affected by road states or traffic conditions.

A processing server of an eleventh aspect includes a communication section configured to communicate with a vehicle delivering a package to a specific user and with a terminal of the specific user, a position information acquisition section configured to acquire position information of the vehicle from the vehicle in which the package is stored, a request acquisition section configured to acquire request information requesting delivery of the package from the terminal, and a retrieval instruction section configured, in a case in which the request information has been acquired and the vehicle corresponding to the position information is proximate to a delivery site corresponding to the specific user, to notify a moving body deployed at the delivery site of the position information of the vehicle and of instruction information instructing retrieval of the package from the vehicle.

The processing server of the eleventh aspect is applied between the vehicle storing the package and the moving body deployed at the delivery site. In the processing server, the moving body retrieves the package from the vehicle and delivers the package to the delivery site in a case in which the vehicle is proximate to the delivery site and the request information requesting delivery of the package has been received. In the processing server of the eleventh aspect, the moving body deployed at the delivery site is configured to go to the vehicle to collect the package, thereby enabling the package storage capacity of the vehicle to be increased.

A processing server of a twelfth aspect is the processing server of the eleventh aspect, wherein the retrieval instruction section is further configured to notify the terminal of the specific user of arrival information relating to arrival of the package in a case in which the vehicle corresponding to the position information is proximate to the delivery site, and transmit the position information and the instruction information to the moving body in a case in which the request information has been acquired from the terminal.

In the processing server of the twelfth aspect, in a case in which the vehicle storing the package addressed to the specific user is proximate to the delivery site, the desire of the user to accept delivery is ascertained, and in a case in which the user wishes to accept delivery, the moving body retrieves the package and delivers the package to the delivery site. In the processing server, in a case in which the user does not wish to accept the package, the moving body can be spared the effort of returning the package to the vehicle, enabling efficient delivery of the package.

The present disclosure enables the provision of a package-storing vehicle capable of increasing the package storage capacity in a case in which the vehicle and a moving body are employed in package delivery.

BRIEF DESCRIPTION OF THE DRAWINGS

Exemplary embodiments of the present disclosure will be described in detail based on the following figures, wherein.

DETAILED DESCRIPTION

Figure 3:
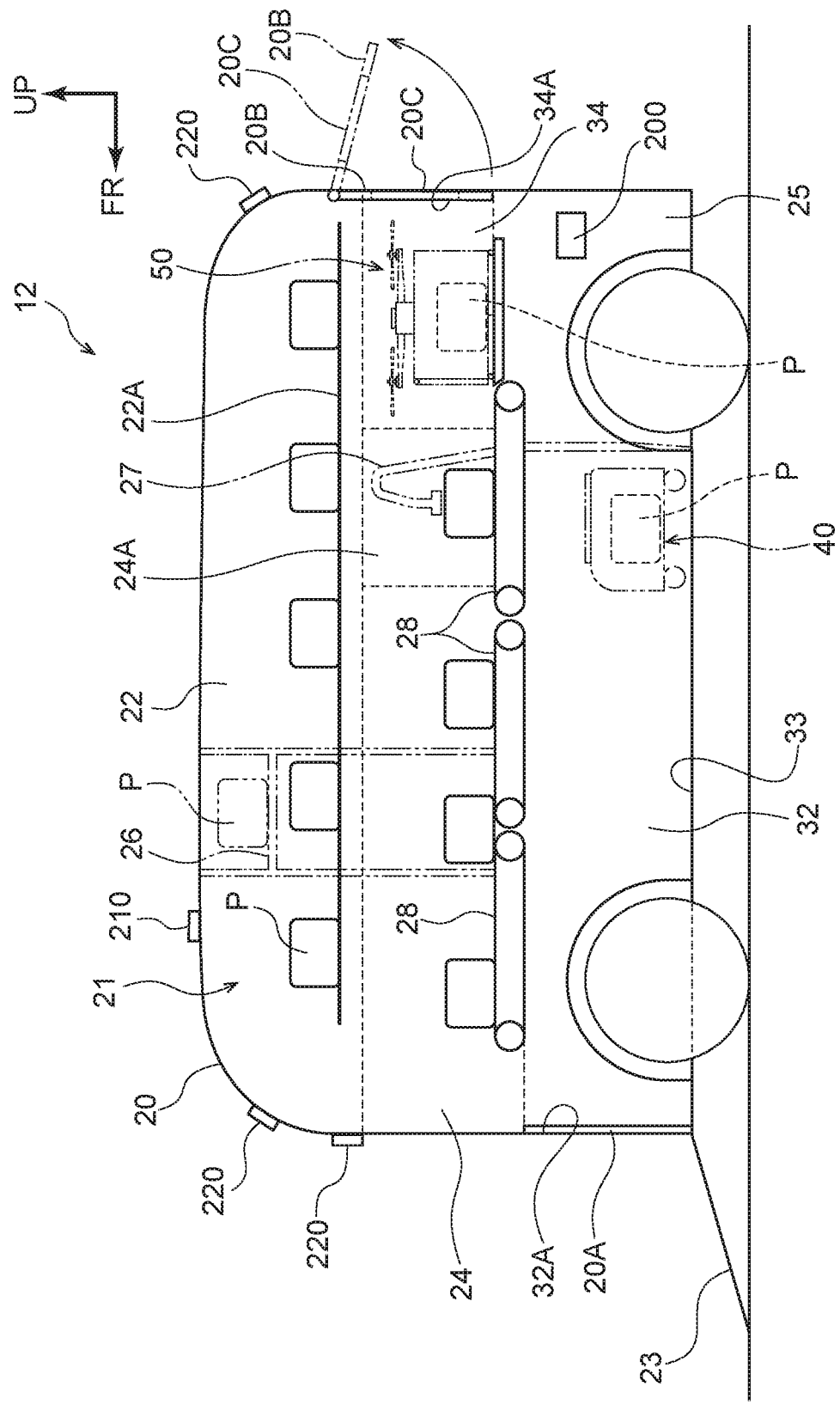
FIG. 3 is a side cross-section to explain a structure of a vehicle.
Figure 6:
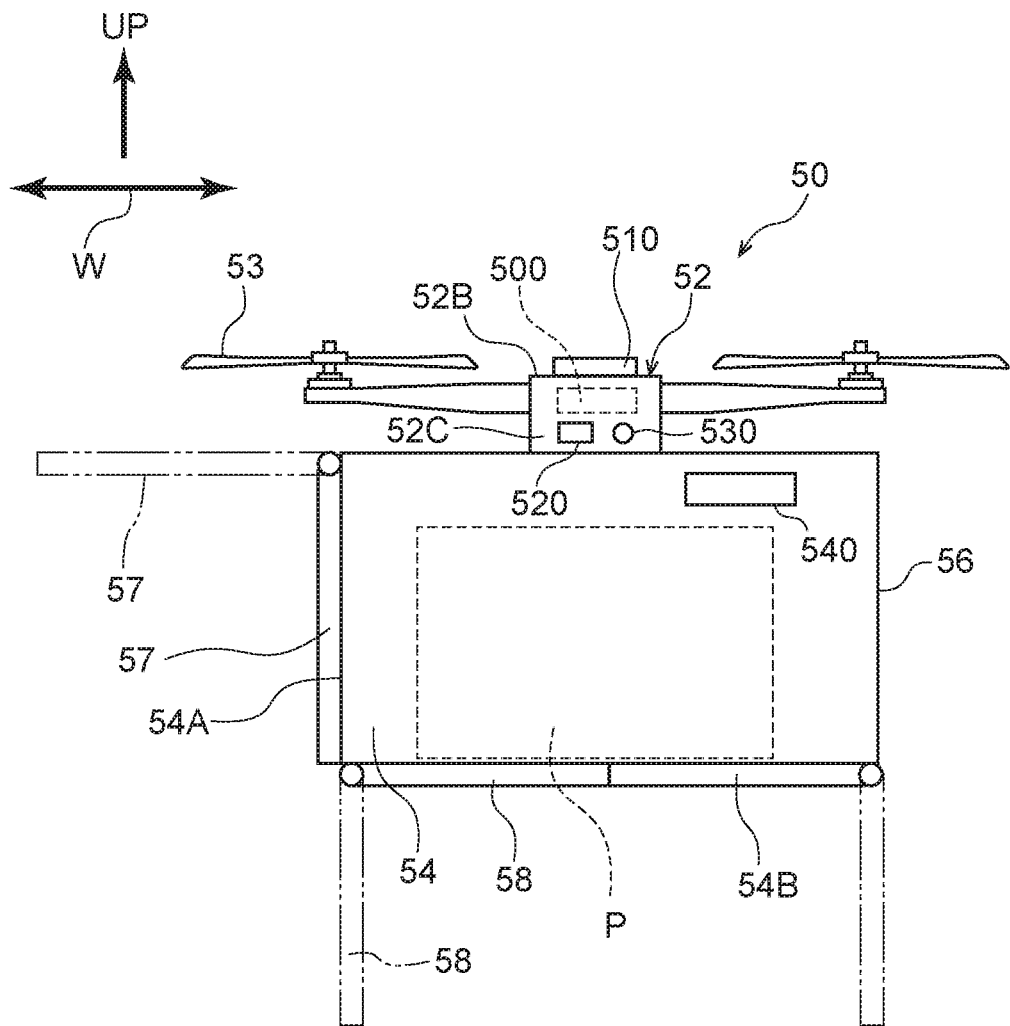
FIG. 6 is a side view to explain a structure of a drone.
Figure 19:
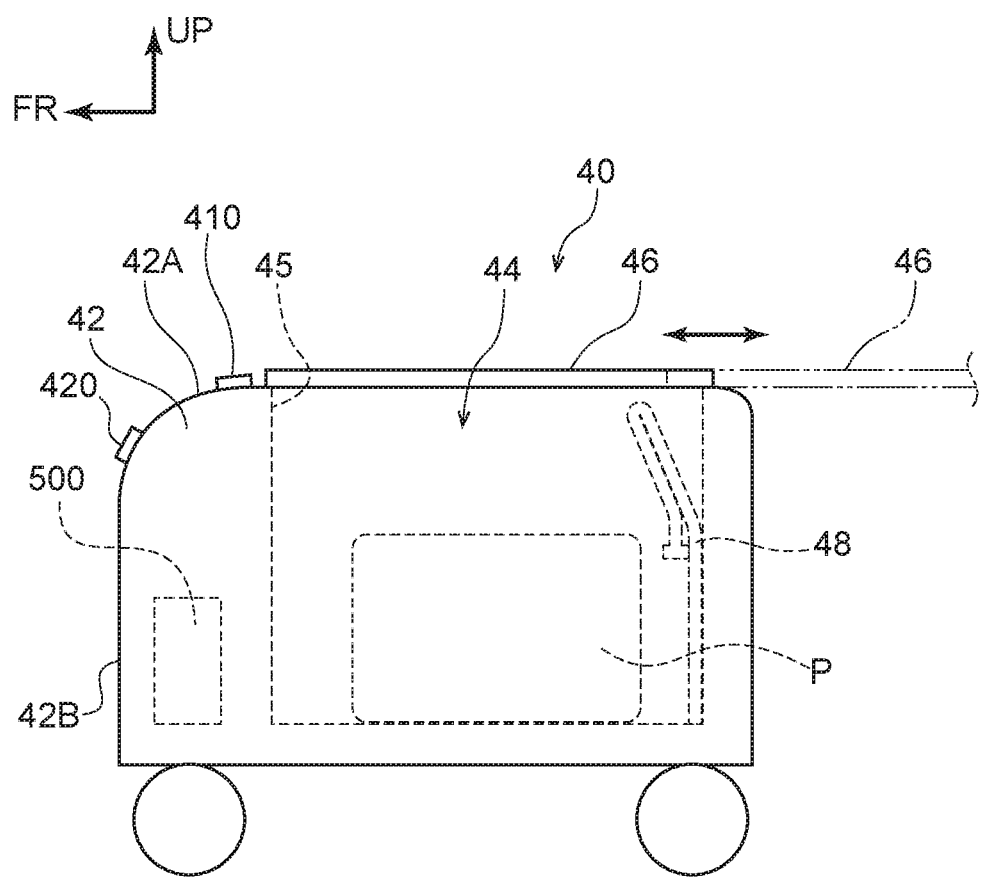
FIG. 19 is a side view to explain a structure of a traveling robot in the fourth exemplary embodiment.

Explanation follows regarding a delivery system and processing server of exemplary embodiments of the present disclosure, with reference to the drawings. In FIG. 3 and FIG. 19, the arrow FR indicates a vehicle front, and the arrow UP indicates a vehicle upper side. In FIG. 6, the arrow UP indicates a body upper side, and the arrow W indicates a body width direction.

Figure 1:
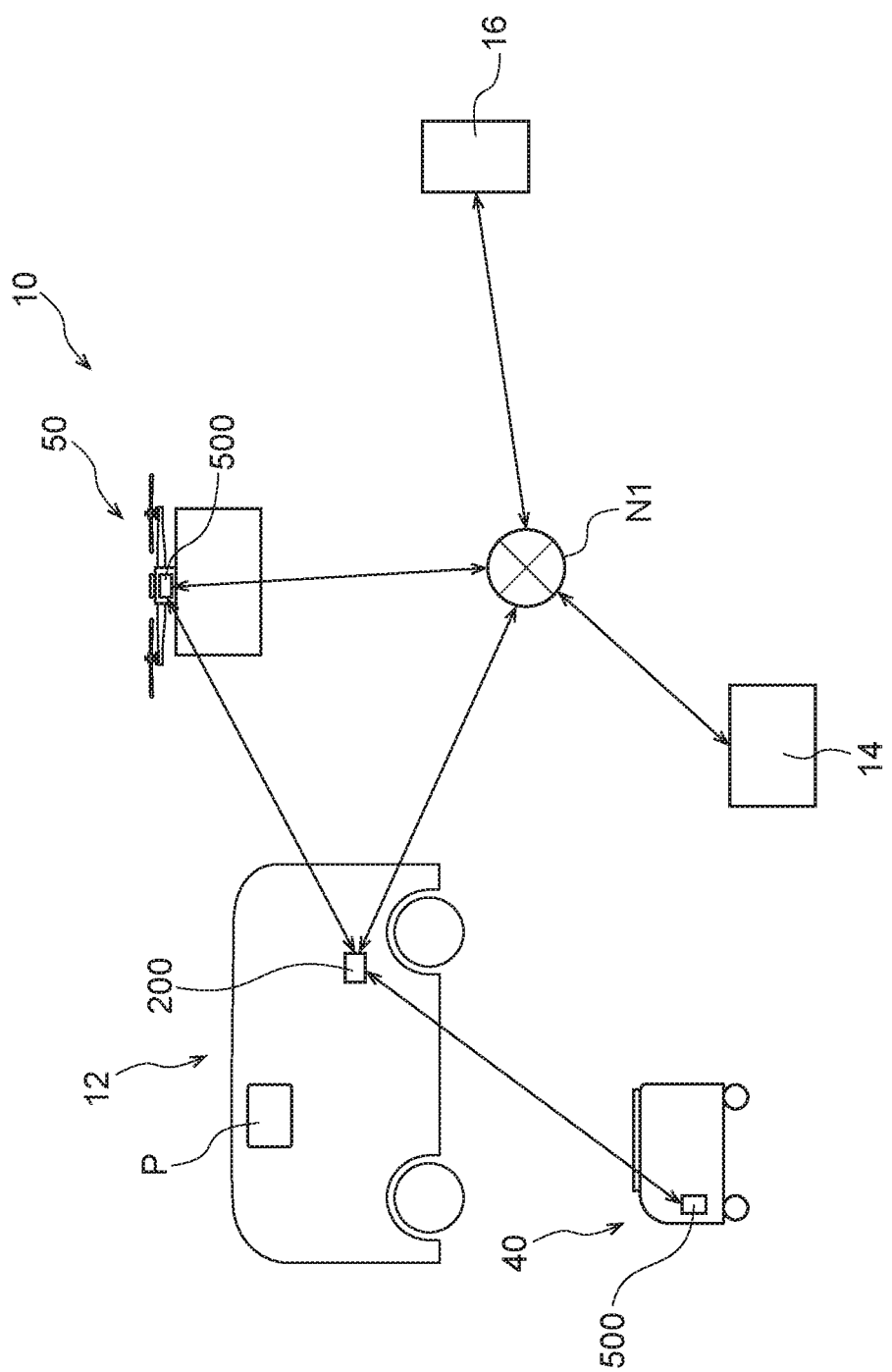
FIG. 1 is a diagram illustrating a schematic configuration of a delivery system according to an exemplary embodiment.

FIG. 1 is a block diagram illustrating a schematic configuration of a delivery system 10 according to the respective exemplary embodiments.

As illustrated in FIG. 1, the delivery system 10 may include a vehicle 12, configuring an autonomous vehicle, a traveling robot 40, configuring a moving body, a drone 50, configuring a moving body, a processing server 14, and a smartphone 16 configuring a terminal. A package P for a specific user C is stored in the vehicle 12. The vehicle 12 is also capable of accommodating the traveling robot 40 and the drone 50 that retrieve the package P.

The vehicle 12 includes a controller 200, the traveling robot 40 includes a controller 500, and the drone 50 includes a controller 500. In the delivery system 10, the controller 200 of the vehicle 12, the controller 500 of the traveling robot 40, the controller 500 of the drone 50, the processing server 14, and the smartphone 16 are connected together through a network N1. The controller 200 is also capable of communicating with the controllers 500 of the traveling robot 40 and the controller 500 of the drone 50 independently of the network N1.

Although only one of each of the vehicle 12, the traveling robot 40, the drone 50, and the smartphone 16 are provided for the single processing server 14 in the delivery system 10 illustrated in FIG. 1, there is no limitation thereto. In reality plural vehicles 12, traveling robots 40, drones 50, and smartphones 16 would be provided for a single processing server 14.

First Exemplary Embodiment

The delivery system 10 according to the present exemplary embodiment is configured by the vehicle 12, the drone 50, the processing server 14, and the smartphone 16 out of the configurations illustrated in FIG. 1. In the present exemplary embodiment, the drone 50 is deployed at a delivery site D of the specific user C, and is configured to retrieve the package P from the vehicle 12 in which the package P is stored.

FIG. 2A to FIG. 2D illustrate a flow of delivery of the package P by the delivery system 10 of the present exemplary embodiment. A product purchased by the user C is stored in the vehicle 12 from a distribution center A as the package P (see FIG. 2A), and the vehicle 12 travels toward the delivery site D where the user C resides (see FIG. 2B). When the vehicle 12 arrives at a destination B set in the vicinity of the delivery site 1), the drone 50 deployed at the delivery site D flies to the vehicle 12, retrieves the package P from the vehicle 12, and flies hack to the delivery site D (see FIG. 2C). The drone 50 then stores the package P in a delivery box 60 (see FIG. 2D). Note that instead of storing the package P in the delivery box 60, the package P may be placed at a predetermined location, or the package P may be handed directly to the user C.

Vehicle

FIG. 3 is a side cross-section illustrating the structure of the vehicle 12 of the present exemplary embodiment. The vehicle 12 of the present exemplary embodiment is not only capable of accommodating the drone 50 that flies from the delivery site D, but also a traveling robot 40 that travels from the delivery site D.

As illustrated in FIG. 3, the vehicle 12 includes a substantially box shaped vehicle body 20 including a cabin 21 having three tiers in a vehicle vertical direction. A cargo hold 22 in which plural packages P are stored is provided at the upper tier of the cabin 21. A sorting room 24 in which packages P are sorted is provided at a vehicle front side of the middle tier of the cabin 21, and a drone bay 34, serving as a second bay capable of accommodating a single drone 50 is provided at the vehicle rear side of the middle tier of the cabin 21. The sorting room 24 is provided over a range corresponding to approximately three quarters of the total length of the vehicle 12, and the drone bay 34 is provided over a range corresponding to approximately one quarter of the total length of the vehicle 12. Note that a region adjoining the drone bay 34 at the vehicle rear side of the sorting room 24 configures a sorting operation area 24A in which a package P is sorted for either the traveling robot 40 or the drone 50.

A vehicle bay 32, serving as a first bay capable of accommodating plural traveling robots 40, is provided at the vehicle front side of the lower tier of the cabin 21, and a unit compartment 25 is provided at the vehicle rear side of the lower tier of the cabin 21. The vehicle bay 32 is provided at the vehicle lower side of the sorting room 24. The unit compartment 25 is provided at the vehicle lower side of the drone bay 34. A drive device of the vehicle 12, a control unit relating to autonomous driving, and the controller 200 relating to package P delivery are housed in the unit compartment 25. A GPS (Global Positioning System) device 210 is provided at an upper section of the vehicle body 20, and plural environmental sensors 220 are provided at the vehicle front and vehicle rear of the vehicle body 20.

A door opening 32A at the vehicle front side of the vehicle bay 32 is provided with a sliding door 20A, supported so as to be capable of opening and closing by sliding in the vehicle width direction. A ramp 23 is also provided, on which the traveling robots 40 are able to travel from a vehicle front side end portion of a floor 33 of the vehicle bay 32 to a road surface. The ramp 23 is capable of being stowed below the floor 33. In the present exemplary embodiment, when the sliding door 20A opens, a traveling robot 40 is able to climb the ramp 23 and pass through the door opening 32A to enter the vehicle bay 32. The sliding door 20A is opened and closed automatically by a mover mechanism, and the ramp 23 is capable of moving accompanying the opening and closing operation of the sliding door 20A by the mover mechanism. Note that instead of the sliding door 20A, a door that is supported at a vehicle lower side end portion may be provided such that a vehicle upper side of the door is capable of pivoting with respect to the door opening 32A, this door being opened until an upper end side of the door contacts the road surface such that an inside face of the door is used as the ramp.

A door opening 34A at the vehicle rear side of the drone bay 34 is provided with a hinged door 20B supported at a vehicle upper side end portion such that a vehicle lower side of the hinged door 20B is capable of pivoting. In the present exemplary embodiment, when the hinged door 20B is opened, the drone 50 is able to pass through the door opening 34A and enter the drone bay 34. In an open state of the hinged door 20B, the hinged door 20B projects from an upper side edge of the door opening 34A toward the rear to form a roof eave. The hinged door 20B is opened and closed automatically by a non-illustrated opening and closing mechanism. Note that instead of the hinged door 20B, a sliding door supported so as to be capable of opening and closing by sliding with respect to the door opening 34A may be provided. A window 20C is formed in a vehicle width direction and vehicle vertical direction central portion of the hinged door 20B.

A passage extending along the vehicle front-rear direction and the vehicle vertical direction is provided at the vehicle width direction center of the cargo hold 22. Racks 22A on which packages P are placed are provided on both vehicle width direction sides of the passage. The passage is provided with a stacker crane 26 to move the packages P in the cargo hold 22 upward, downward, and toward the front and rear, and to move the packages P into the sorting room 24. Conveyors 28 are provided to a floor spanning from the sorting room 24 including the sorting operation area 24A to the drone bay 34 in order to move packages P toward the front and rear. A robotic arm 27 is provided spanning from the sorting operation area 24A to the vehicle bay 32.

In the present exemplary embodiment, when a specific package P is to be handed over to the traveling robot 40 or the drone 50, first, the package P is taken from the racks 22A in the cargo hold 22 and placed on the corresponding conveyor 28 in the sorting room 24 by the stacker crane 26. In the sorting room 24, the one package P amongst plural packages P is moved into the sorting operation area 24A by the conveyors 28. In the sorting operation area 24A, the package P is moved into to the drone bay 34 or the vehicle bay 32 according to the moving body to which the package P is to be passed.

In a case in which the package P is moved into the drone bay 34, the package P is stored in a storage compartment 54 of the drone 50, described later, by the corresponding conveyor 28. In a case in which the package P is moved into the vehicle bay 32, the package P is stored in a storage compartment 44 of the traveling robot 40, described later, by the robotic arm 27.

Figure 4:
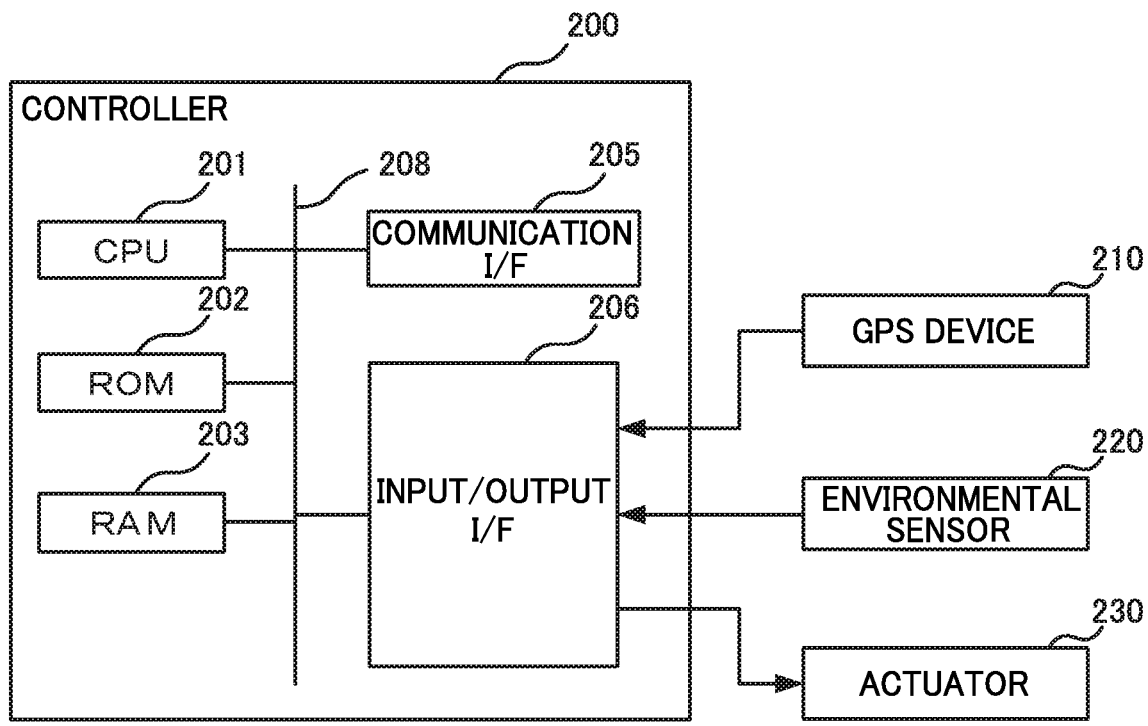
FIG. 4 is a block diagram illustrating a hardware configuration of a vehicle controller.

FIG. 4 is a block diagram illustrating a hardware configuration of devices installed to the vehicle 12 of the present exemplary embodiment. In addition to the controller 200 described above, the vehicle 12 includes the GPS device 210 that acquires the current position of the vehicle 12, the environmental sensors 220 to perform detection of the environment around the vehicle 12, and an actuator 230 that performs acceleration, deceleration, and steering of the vehicle 12. Note that the environmental sensors 220 are configured including cameras that image a predetermined range, millimeter wave radar that transmits exploratory waves in a predetermined range, and LIDAR (Light Detection and Ranging/Laser Imaging Detection and Ranging) that scans a predetermined range.

The controller 200 is configured including a Central Processing Unit (CPU) 201, Read Only Memory (ROM) 202, Random Access Memory (RAM) 203, a communication interface (I/F) 205, and an input/output I/F 206. The CPU 201, the ROM 202, the RAM 203, the communication I/F 205, and the input/output I/F 206 are connected through a bus 208 so as to be capable of communicating with each other. The CPU 201 corresponds to a second processor, and the RAM 203 corresponds to a second memory.

The CPU 201 is a central processing unit that executes various programs and controls the respective sections. Namely, the CPU 201 reads a program from the ROM 202, and executes the program employing the RAM 203 as a workspace. In the present exemplary embodiment, an execution program is stored in the ROM 202. By executing the execution program, the CPU 201 functions as a communication section 250 serving as a vehicle communication section, a position acquisition section 251, an environment detection section 252, a travel plan creation section 254, an autonomous driving control section 256, a notification section 258, and a package control section 262, all illustrated in FIG. 5.

The ROM 202 stores various programs and various data. The RAM 203 functions as a workspace in which programs and data are temporarily stored.

The communication I/F 205 is an interface for communication with the controllers 500, the processing server 14, and the like. For example, the communication I/F 205 employs a communication standard such as Long Term Evolution (LTE) or Wi-Fi (registered trademark).

The input/output I/F 206 is an interface for communication with the respective devices installed to the vehicle 12. In the present exemplary embodiment, the GPS device 210, the environmental sensors 220, and the actuator 230 are connected to the controller 200 through the input/output I/F 206. The GPS device 210, the environmental sensors 220, and the actuator 230 may be directly connected to the bus 208.

Figure 5:
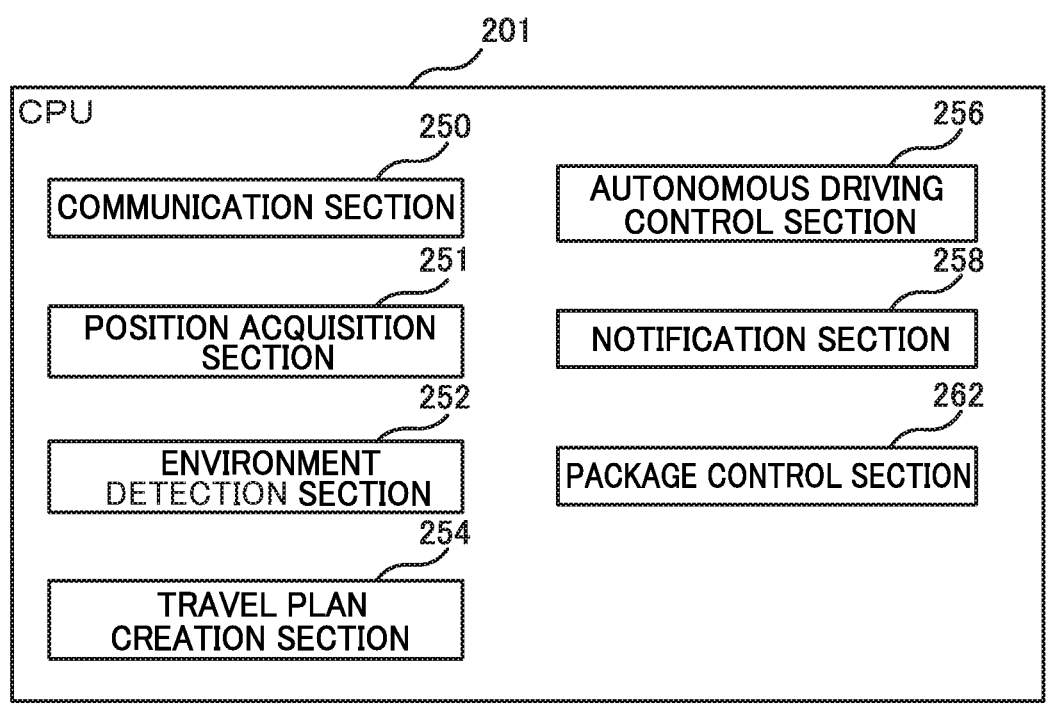
FIG. 5 is block diagram illustrating an example of functional configuration of a CPU of a vehicle controller in the first exemplary embodiment.

FIG. 5 is a block diagram illustrating an example of a functional configuration of the CPU 201. As illustrated in FIG. 5, the CPU 201 includes the communication section 250, the position acquisition section 251, the environment detection section 252, the travel plan creation section 254, the autonomous driving control section 256, the notification section 258, and the package control section 262. Each functional configuration is implemented by the CPU 201 reading and executing the execution program stored in the ROM 202.

The communication section 250 has a function of transmitting and receiving various information via the communication I/F 205.

The position acquisition section 251 has a function of acquiring a current position of the vehicle 12. The position acquisition section 251 acquires position information from the GPS device 210 via the input/output I/F 206.

The environment detection section 252 has a function of detecting the travel environment around the vehicle 12. The environment detection section 252 senses the travel environment of the vehicle 12 as travel environment information from the environmental sensors 220 via the input/output I/F 206. The "travel environment information" includes the weather, brightness, road width, obstacles, and the like around the vehicle 12. The travel environment information includes information related to the traveling robot 40 traveling by road or the flying drone 50. The environment detection section 252 is thus capable of detecting the traveling robot 40 and the drone 50.

The travel plan creation section 254 has a function of creating a travel plan for the vehicle 12 from the distribution center A, through one or plural destinations B, and back to the distribution center A. In particular, in a case in which there are plural delivery sites D, the travel plan creation section 254 is capable of making a travel plan based on the respective movement distances of the departing drones 50 from the corresponding delivery site D to the vehicle 12.

The autonomous driving control section 256 has a function of making the vehicle 12 travel by actuating the actuator 230 according to the created travel plan while taking the position information and the travel environment information into account.

The notification section 258 has a function of notifying the processing server 14 of the position information acquired by the position acquisition section 251. The notification section 258 also has a function of notifying the processing server 14 of accommodation availability information regarding whether or not the traveling robot 40 or the drone 50 can be accommodated in the vehicle 12. The position information and the accommodation availability information are transmitted to the processing server 14 via the communication I/F 205.

The package control section 262, serving as a detection control section, has a function of enabling access to the package P for the traveling robot 40 or the drone 50. "Enabling access to the package P" corresponds to both cases in which the traveling robot 40 or the drone 50 is allowed inside the vehicle 12 in which the package P is present, and cases in which the package P is passed out to the exterior of the vehicle 12 where the traveling robot 40 or the drone 50 is present. The package control section 262 of the present exemplary embodiment opens the hinged door 20B in a case in which the presence of the drone 50 around the vehicle 12 has been detected by the environment detection section 252.

Drone

In the present exemplary embodiment, a drone configured by an unmanned multicopter is applied as the moving body. FIG. 6 is a side view illustrating the structure of the drone 50 of the present exemplary embodiment. As illustrated in FIG. 6, the drone 50 is configured including a drone body 52 provided with plural propellers 53, and a conveyance case 56 fixed to a lower end of the drone body 52.

The drone body 52 is substantially box shaped. An upper section 52B of the drone body 52 is provided with a GPS device 510, and at least a body front side section 52C of the drone body 52 is provided with an environmental sensor 520 that performs detection of the environment around the drone 50. A camera 530, serving as an imaging device, is also provided to the body front side section 52C. The controller 500, serving as a flight control section, is provided inside the drone body 52. An LED display 540, serving as a display device, is provided to a front face of the conveyance case 56.

The conveyance case 56 is a rectangular parallelepiped box, and the inside of the conveyance case 56 configures the storage compartment 54 in which the package P is stored. One side wall 54A of the conveyance case 56 configures an opening and closing door 57 that pivots toward the body upper side. A bottom portion 54B of the conveyance case 56 configures an opening door 58, this being a double door that pivots toward the body lower side.

Figure 7:
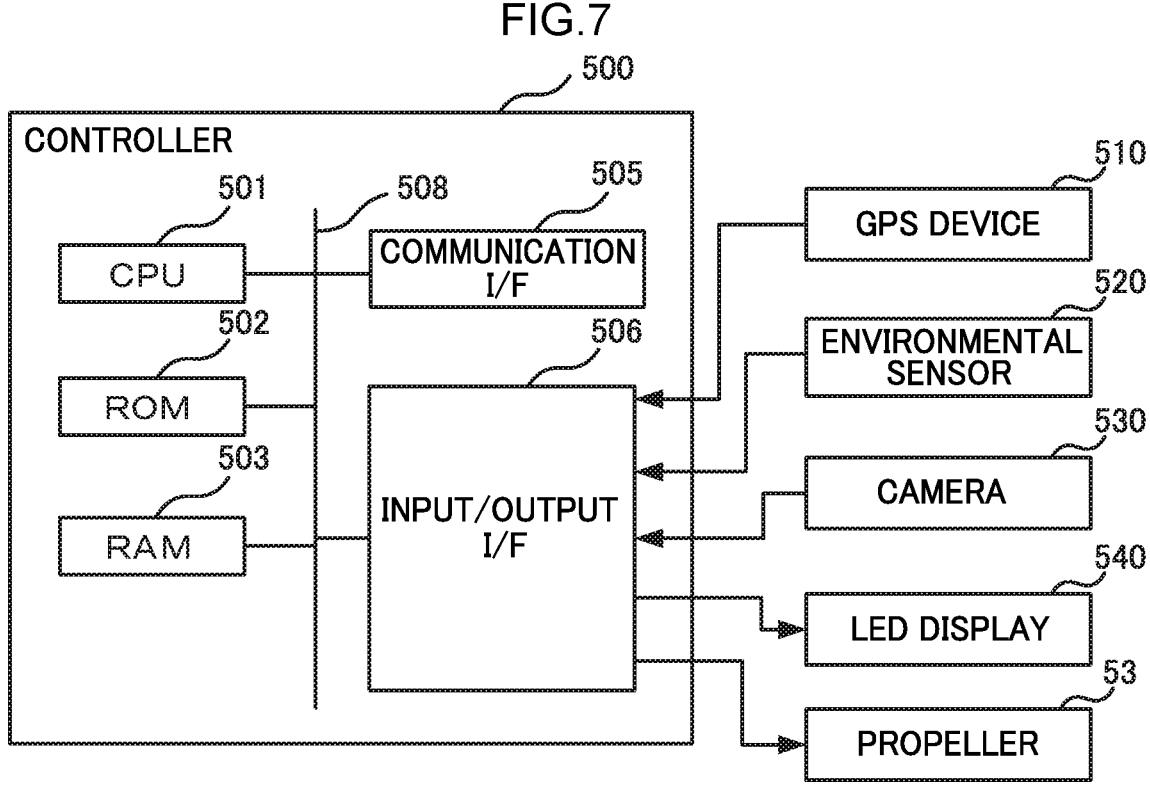
FIG. 7 is a block diagram illustrating a hardware configuration of a drone controller.

FIG. 7 is a block diagram illustrating a hardware configuration of the drone 50 of the present exemplary embodiment. In addition to the controller 500 described above, the drone 50 includes the GPS device 510 that acquires the current position of the drone 50, and the environmental sensor 520 that performs detection of the environment around the drone 50. The drone 50 further includes the camera 530 that images around the drone 50, and the LED display 540 that is capable of displaying package information relating to the package. The environmental sensor 520 is configured including an ultrasound sensor, a gyro sensor, an air pressure sensor, a compass, and the like.

The controller 500 is configured including a CPU 501, ROM 502, RAM 503, a communication I/F 505, and an input/output I/F 506. The CPU 501, the ROM 502, the RAM 503, the communication I/F 505, and the input/output I/F 506 are connected together through a bus 508 so as to be capable of communicating with each other. Functionality of the CPU 501, the ROM 502, the RAM 503, the communication I/F 505, and the input/output I/F 506 is similar to that of the CPU 201, the ROM 202, the RAM 203, the communication I/F 205, and the input/output I/F 206 of the controller 200 described above. The CPU 501 corresponds to a first processor, and the RAM 503 corresponds to a first memory.

The CPU 501 reads a program from the ROM 502, and executes the program employing the RAM 503 as a workspace. In the present exemplary embodiment, an execution program is stored in the ROM 502. By executing the execution program, the CPU 501 functions as a communication section 550 serving as a moving body communication section, a position acquisition section 551, a moving environment detection section 552, a movement plan creation section 554, and a retrieval control section 556, all illustrated in FIG. 8.

The GPS device 510, the environmental sensor 520, the camera 530, the LED display 540, and the propellers 53 are connected to the controller 500 of the present exemplary embodiment via the input/output I/F 506. Note that the GPS device 510, the environmental sensor 520, the camera 530, the LED display 540, and the propellers 53 may be directly connected to the bus 508.

Figure 8:
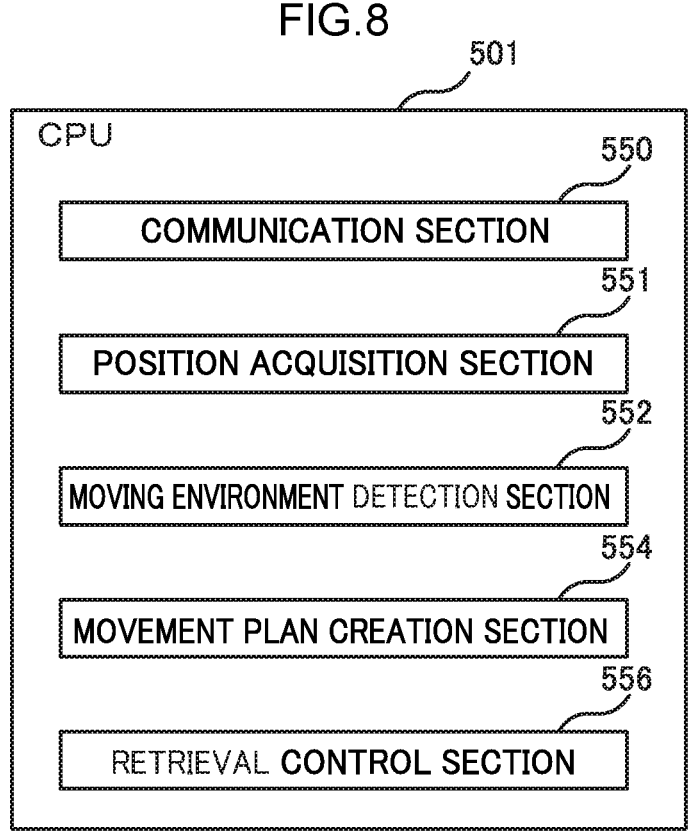
FIG. 8 is a block diagram illustrating an example of functional configuration of a CPU of a drone controller in the first exemplary embodiment.

FIG. 8 is a block diagram illustrating an example of functional configuration of the CPU 501. As illustrated in FIG. 8, the CPU 501 includes the communication section 550, the position acquisition section 551, the moving environment detection section 552, the movement plan creation section 554, and the retrieval control section 556. Each functional configuration is implemented by the CPU 501 reading and executing the execution program stored in the ROM 502.

The communication section 550 has a function of transmitting and receiving various information via the communication I/F 505.

The position acquisition section 551 has a function of acquiring a current position of the drone 50. The position acquisition section 551 acquires position information from the GPS device 510 via the input/output I/F 506.

The moving environment detection section 552 has a function of perceiving a flight environment around the drone 50. The moving environment detection section 552 acquires the flight environment of the drone 50 from the environmental sensor 520 via the input/output I/F 506 as flight environment information. Note that the "flight environment information" includes the weather, brightness, obstacles, and the like around the drone 50.

The movement plan creation section 554 has a function of creating a flight plan (movement plan) from the delivery site D of the user C, to the vehicle 12, and back to the delivery site D. The movement plan creation section 554 acquires a travel plan from the vehicle 12, and predicts the arrival time of the drone 50 at the vehicle 12 (at the destination B) and the arrival time of the vehicle 12 at the destination B based on the travel plan of the vehicle 12 and the flight plan of the drone 50.

The retrieval control section 556 has a function of flying the drone 50 by operating the respective propellers 53 according to the created flight plan, while taking the flying environment into account. The retrieval control section 556 is also capable of flying the drone 50 in a case in which it has been determined that the arrival of the drone 50 at the destination B will be later than the arrival of the vehicle 12 at the destination B. The retrieval control section 556 also has a function of opening the opening and closing door 57 to retrieve the package P, and opening the opening door 58 to drop the package P.

Processing Server

Figure 9:
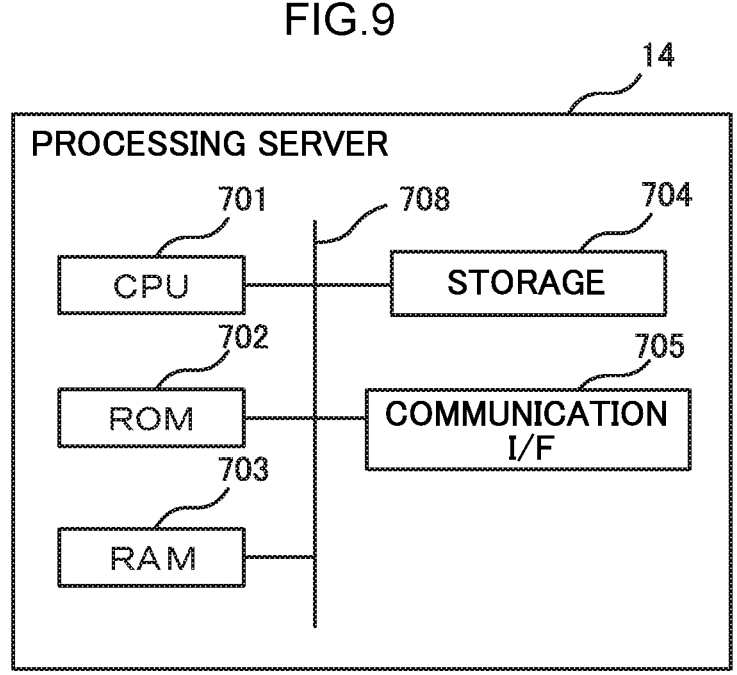
FIG. 9 is a block diagram illustrating a hardware configuration of a processing server.

As illustrated in FIG. 9, the processing server 14 is configured including a CPU 701, ROM 702, RAM 703, storage 704, and a communication I/F 705. The CPU 701, the ROM 702, the RAM 703, the storage 704, and the communication I/F 705 are connected through a bus 708 so as to be capable of communicating with each other. The functionality of the CPU 701, the ROM 702, the RAM 703, and the communication I/F 705 is similar to that of the CPU 201, the ROM 202, the RAM 203, and the communication I/F 205 of the controller 200 described above. The CPU 701 corresponds to a third processor, and the RAM 703 corresponds to a third memory.

The CPU 701 reads a program from the ROM 702 or the storage 704, and executes the program employing the RAM 703 as a workspace. In the present exemplary embodiment, a processing program is stored in the storage 704. By executing the processing program, the CPU 701 functions as a communication section 750 serving as a server communication section, a position information acquisition section 752, an arrival notification section 756, a request processing section 758, and a retrieval instruction section 760, all illustrated in FIG. 10.

The storage 704, serving as a storage section, is configured by a Hard Disk Drive (HDD) or a Solid State Drive (SSD), and stores various programs, including an operating system, and various data.

Figure 10:
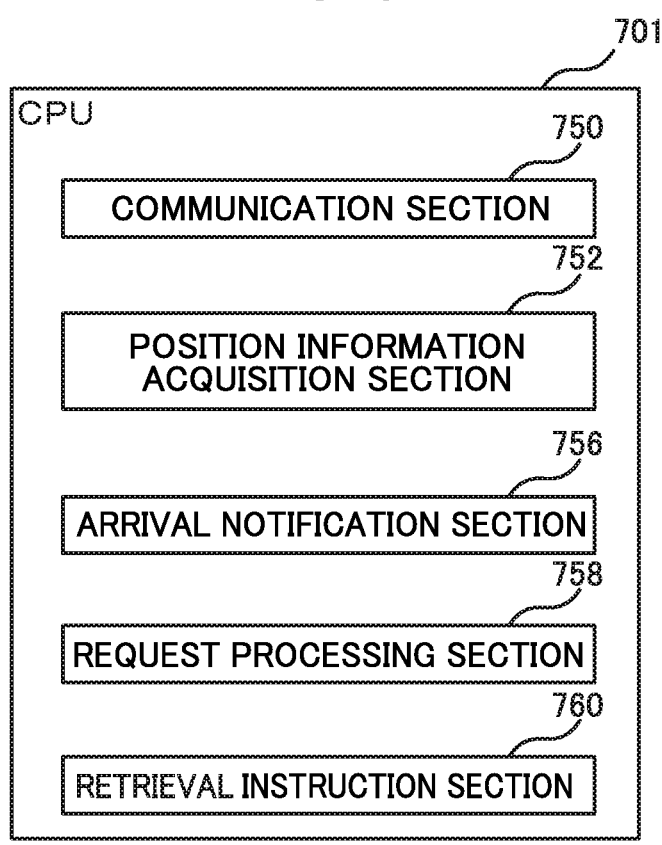
FIG. 10 is a block diagram illustrating an example of functional configuration of a CPU of a processing server.

FIG. 10 is a block diagram illustrating an example of functional configuration of the CPU 701. As illustrated in FIG. 10, the CPU 701 includes the communication section 750, the position information acquisition section 752, the arrival notification section 756, the request processing section 758, and the retrieval instruction section 760. Each functional configuration is implemented by the CPU 701 reading and executing the processing program stored in the storage 704.

The communication section 750 has a function of transmitting and receiving various information via the communication I/F 705.

The position information acquisition section 752 has a function of acquiring position information of the vehicle 12, the traveling robot 40 and the drone 50 via the communication I/F 705.

The arrival notification section 756, serving as a notification section, has a function of notifying the user C of the arrival of the package P. Specifically, the arrival notification section 756 transmits arrival information indicating that the package P is to arrive to the smartphone 16 of the user C via the communication I/F 705 when the vehicle 12 is proximate to the destination B set in the vicinity of the delivery site D according to the travel plan of the vehicle 12. The arrival notification section 756 also has a function of notifying the drone 50 with an activation signal to turn on a power source so as to place the drone 50 in an activated state. Specifically, the arrival notification section 756 transmits an activation signal to the drone 50 via the communication I/F 705 when the vehicle 12 is proximate to the destination B.

The request processing section 758, serving as a request acquisition section, has a function of acquiring request information in which the user C requests delivery of the package P. Specifically, the request processing section 758 receives request information from the smartphone 16 via the communication I/F 705.

The retrieval instruction section 760 has a function of notifying the traveling robot 40 or the drone 50 of the position information of the vehicle 12 and instruction information instructing retrieval of the package P from the vehicle 12. On acquisition of request information by the request processing section 758, the retrieval instruction section 760 transmits the position information of the vehicle 12 acquired by the position information acquisition section 752, destination information relating to the destination B, package information relating to the package P, and instruction information to the traveling robot 40 or the drone 50 that is to retrieve the package P. A unique package number of the package P corresponds to the package information. Note that the package information itself may be employed as the instruction information.

Flow when Retrieving Package

Figure 11:
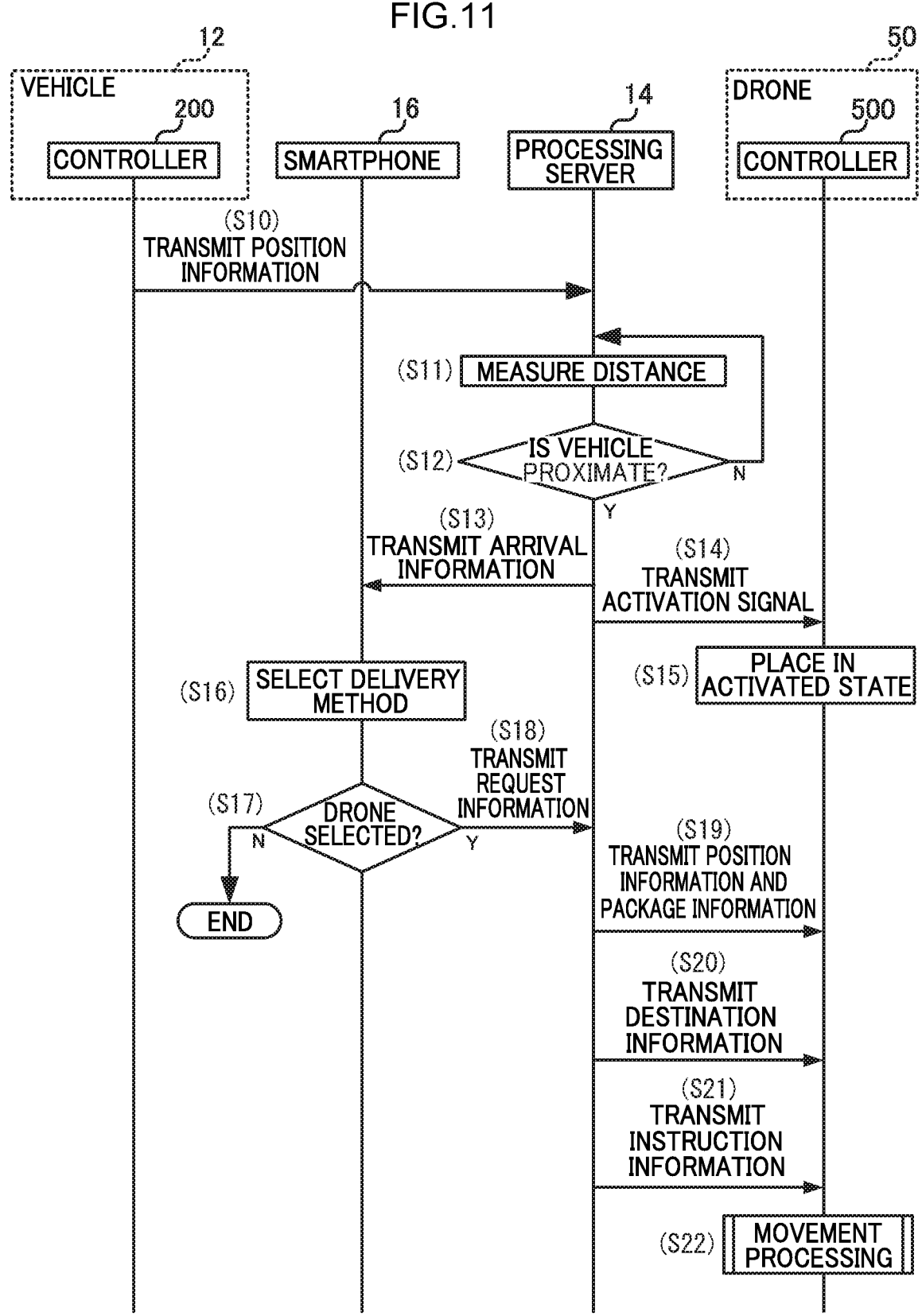
FIG. 11 is a sequence chart illustrating an example of a flow of processing performed by a delivery system.
Figure 12:
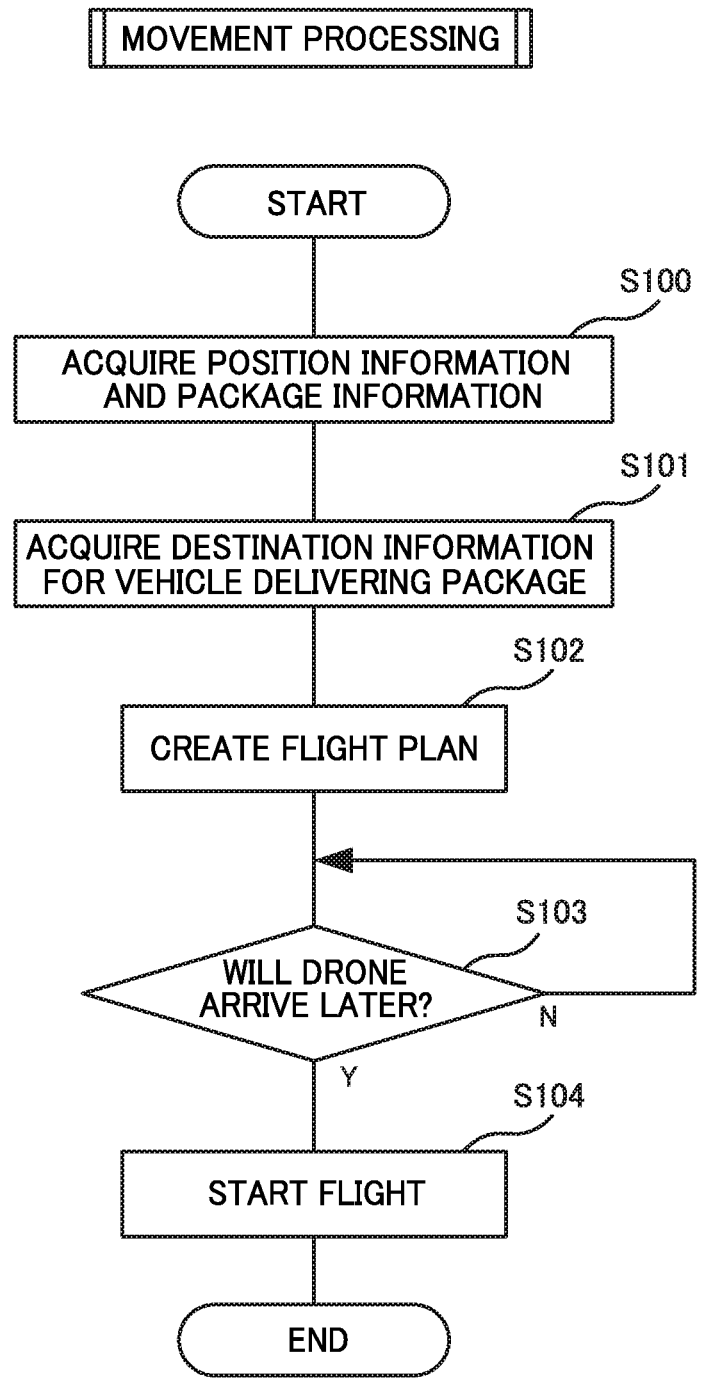
FIG. 12 is a flowchart illustrating an example of a flow of movement processing performed by a drone.
Figure 13:
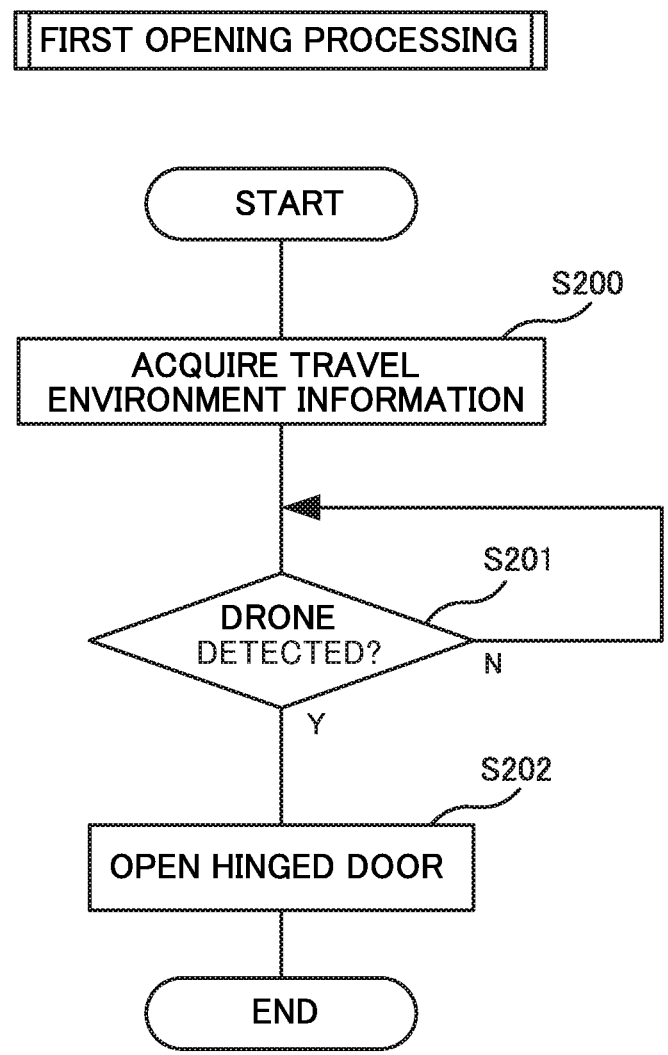
FIG. 13 is a flowchart illustrating an example of a flow of first opening processing performed by a vehicle of the first exemplary embodiment.

Explanation follows regarding a flow of processing in the delivery system 10 of the present exemplary embodiment, with reference to the sequence chart of FIG. 11 and the flowcharts of FIG. 12 and FIG. 13.

Figure 2A:
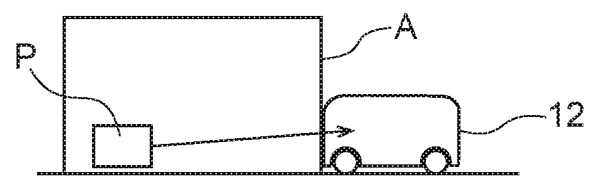
FIG. 2A is a diagram to explain a delivery flow of a package in a first exemplary embodiment.
Figure 2B:
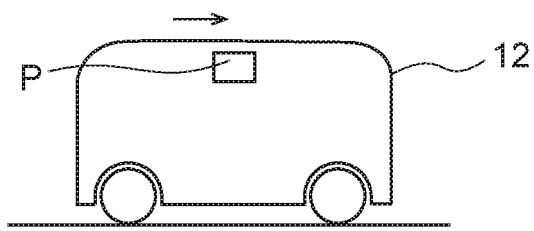
FIG. 2B is a diagram to explain a delivery flow of a package in the first exemplary embodiment.
Figure 2C:
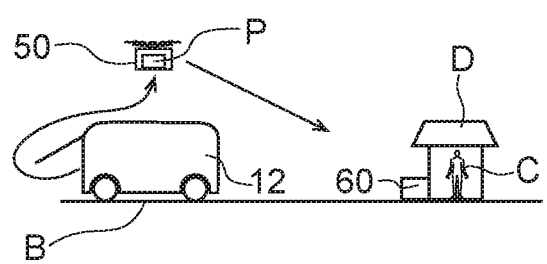
FIG. 2C is a diagram to explain a delivery flow of a package in the first exemplary embodiment.
Figure 2D:
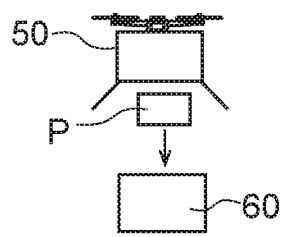
FIG. 2D is a diagram to explain a delivery flow of a package in the first exemplary embodiment.

As described above, the vehicle 12 in which the package P to be delivered to the user C is stored travels toward the destination B (see FIG. 2A and FIG. 2B).

Next, explanation follows regarding a flow of processing executed as the vehicle 12 gets proximate to the destination B.

At step S10 in FIG. 11, the CPU 201 of the controller 200 of the vehicle 12 transmits position information of the vehicle 12 to the processing server 14. Note that the travel plan of the vehicle 12 and the destination information have already been transmitted to the processing server 14 at the point in time when the vehicle 12 departs the distribution center A.

At step S11, the CPU 701 of the processing server 14 measures the distance between the vehicle 12 and the destination B. In this measurement, the distance between the vehicle 12 and the destination B is measured based on the acquired position information of the vehicle 12. Note that instead of the distance between the vehicle 12 and the destination B, measurement may be made based on the distance between the vehicle 12 and the delivery site D.

At step S12, the CPU 701 determines whether or not the vehicle 12 is proximate to the destination B. In a case in which the CPU 701 determines that the vehicle 12 is proximate to the destination B, processing proceeds to step S13. In a case in which the CPU 701 determines that the vehicle 12 is not proximate to the destination B, processing returns to step S11.

At step S13, the CPU 701 transmits arrival information to the smartphone 16 of the user C.

At step S14, the CPU 701 transmits an activation signal to the controller 500 of the drone 50.

At step S15, the CPU 501 of the controller 500 of the drone 50 turns on the power source of the drone 50 based on the activation signal such that the drone 50 is placed in the activated state.

At step S16, a package P delivery method is selected by user C operation of the smartphone 16. For example, an application on the smartphone 16 displays "Accept delivery" and "Do not accept delivery" on a display screen, and the user C is able to make a selection by performing a tapping operation. In a case in which "Accept delivery" is selected, "Drone delivery" and "Customer collection" are displayed on the display screen, and the user C is able to make a selection by performing a tapping operation. Note that in a case in which the user C does not select a delivery method using the smartphone 16, for example in a case in which no tapping operation is performed, this may be treated as being a "Do not accept delivery" selection, or may be treated as being a "Drone delivery" selection.

At step S17, the smartphone 16 determines whether or not delivery by the drone 50 is desired. In a case in which the smartphone 16 determines that delivery by the drone 50 is desired, processing proceeds to step S18. In a case in which the smartphone 16 determines that delivery by the drone 50 is not desired, the processing is ended. Note that accompanying the end of processing, end information relating to the end of processing may be transmitted to the processing server 14, and an activation end signal may be transmitted to the drone 50 from the processing server 14 on receipt of the end information. The power source of the drone 50 that has received the activation end signal is placed in an OFF state from the activated state. In a case in which the user C selects customer collection, the smartphone 16 may be notified of the arrival of the vehicle 12 when the vehicle 12 has arrived at the destination B.

At step S18, the smartphone 16 transmits request information to the processing server 14.

At step S19, the CPU 701 of the processing server 14 transmits position information and package information to the drone 50.

At step S20, the CPU 701 of the processing server 14 transmits destination information relating to the destination B to the drone 50.

At step S21, the CPU 701 of the processing server 14 transmits instruction information to the drone 50 to instruct the drone 50 to retrieve the package P.

At step S22, the CPU 501 of the drone 50 receives the instruction information and executes movement processing to move the drone 50 to the vehicle 12. The movement processing is described in detail below.

Next, explanation follows regarding the movement processing performed by the drone 50 to move toward the vehicle 12.

At step S100 in FIG. 12, the CPU 501 acquires the position information of the vehicle 12 and the package information of the package P transmitted from the processing server 14 at step S19 described above. Processing then proceeds to step S101.

At step S101, the CPU 501 acquires the destination information relating to the destination B of the vehicle 12 transmitted from the processing server 14 at step S20 described above. Processing then proceeds to step S102.

At step S102, the CPU 501 creates a flight plan for the drone 50. Specifically, the CPU 501 creates a flight plan to fly to the vehicle 12 that has stopped at the destination B, and then to fly to the delivery box 60 at the delivery site D after retrieving the package P. Processing then proceeds to step S103.

At step S103, the CPU 501 determines whether or not the drone 50 will arrive at the destination B after the vehicle 12 has arrived at the destination B. In a case in which the CPU 501 determines that the drone 50 will arrive later, processing proceeds to step S104. In a case in which the CPU 501 determines that the drone 50 will not arrive later, namely that the drone 50 will arrive first, processing returns to step S103. Namely, the drone 50 postpones flying until a state in which the vehicle 12 will arrive first at the destination B is achieved.

At step S104, the CPU 501 starts flying the drone 50. The movement processing is then ended.

The drone 50 flies to the vehicle 12 based on the movement processing in this manner.

Next, explanation follows regarding first opening processing in the vehicle 12 to open the hinged door 20B to allow the drone 50 access to the package P.

At step S200 in FIG. 13, the CPU 201 acquires the travel environment information. Processing then proceeds to step S201.

At step S201, the CPU 201 determines whether or not the drone 50 has been detected based on the travel environment information. In a case in which the CPU 201 determines that the drone 50 has been detected, processing proceeds to step S202. In a case in which the CPU 201 determines that the drone 50 has not been detected, the processing of step S201 is repeated.

At step S202, the CPU 201 opens the hinged door 20B. The drone 50 is thus able to enter and dock in the drone bay 34. The first opening processing is then ended.

After entering the drone bay 34, the drone 50 then opens the opening and closing door 57. Next, the corresponding conveyor 28 in the vehicle 12 is used to store the package P in the storage compartment 54. The drone 50 in which the package P has been stored then flies toward the delivery site D, and drops the package P into the delivery box 60 to complete delivery (see FIG. 2D).

SUMMARY

In the delivery system 10 of the present exemplary embodiment, when the vehicle 12 is proximate to the delivery site D, the drone 50 retrieves the package P from the vehicle 12 and delivers the package P to the delivery site D. In the present exemplary embodiment, the drone 50 deployed at the delivery site D is configured to go to the vehicle 12 to collect the package P, thereby enabling the package P storage capacity of the vehicle 12 to be increased in comparison to cases in which a drone 50 loaded into the vehicle 12 delivers the package P.

Regarding advantageous effects of the operation with respect to the processing server 14, the processing server 14 of the present exemplary embodiment is applied between the vehicle 12 in which the package P is stored and the drone 50 deployed at the delivery site D. When the vehicle 12 is proximate to the delivery site D and the processing server 14 has received request information requesting delivery of the package P, the drone 50 retrieves the package P from the vehicle 12 and delivers the package P to the delivery site D. The processing server 14 of the present exemplary embodiment is configured such that the drone 50 deployed at the delivery site D goes to the vehicle 12 to collect the package P, thereby enabling the package P storage capacity of the vehicle 12 to be increased.

Moreover, in the present exemplary embodiment, after the user C has requested delivery of the package P, the drone 50 creates a flight plan before flying, thereby suppressing unnecessary flying en route to the vehicle 12. Accordingly, the present exemplary embodiment enables power consumption of a battery of the drone 50 to be suppressed.

In the present exemplary embodiment, the arrival time of the drone 50 at the destination B and the arrival time of the vehicle 12 at the destination B are predicted, and the drone 50 is only flown in cases in which it has been determined that the arrival of the drone 50 at the destination B will be later than the arrival of the vehicle 12 at the destination B. In the present exemplary embodiment, the drone 50 is made to arrive at the destination B after the vehicle 12, thereby suppressing unnecessary waiting of the drone 50 at the destination B. In particular, the drone 50 consumes power if it waits while in flight. The present exemplary embodiment is thus capable of further suppressing power consumption of the battery of the drone 50.

This is not limited to cases in which the drone 50 is battery-driven, and fuel consumption can also be suppressed in cases in which the drone 50 is fuel-driven.

In the present exemplary embodiment, the drone 50 is activated at a point in time when the vehicle 12 is proximate to the delivery site D, thus enabling the drone 50 to be moved toward the vehicle 12 as soon as the instruction information has been received. Since activation of the controller 500 and the acquisition of the position information and bearing by the GPS device 510 take a certain amount of time, the present exemplary embodiment enables time loss during delivery to be reduced. In particular, the position information and bearing acquired by the GPS device 510 are imprecise immediately after activation. Accordingly, adopting the activated state in advance enables acquisition of the position information history of the vehicle 12 and correction of the position of the drone 50 to be performed. The direction of progress of the drone 50 may also be associated with the direction of progress of the vehicle 12.

In the delivery system 10 of the present exemplary embodiment, configuring the vehicle 12 as an autonomous vehicle and automating sorting of the package P and storage of the package P in the drone 50 enables a reduction in the number of workers required for delivery.

In the present exemplary embodiment, the vehicle 12 performs the hinged door 20B opening operation when the drone 50 has been detected. This enables the drone 50 to retrieve the package from the vehicle 12 even in cases in which the vehicle 12 is an autonomous vehicle.

In the present exemplary embodiment, the drone 50 is applied as the moving body, enabling the package P to be delivered without being affected by road states or traffic conditions.

In the processing server 14 of the present exemplary embodiment, when the vehicle 12 storing the package P addressed to the specific user C is proximate to the delivery site D, the desire of the user C to accept delivery is ascertained using the smartphone 16, and in a case in which the user C wishes to accept delivery, the drone 50 retrieves the package P and delivers the package P to the delivery site D. In the present exemplary embodiment, in a case in which the user C does not wish to accept the package P, the drone 50 can be spared the effort of returning the package P to the vehicle 12, enabling efficient delivery of the package P.

Figure 21:
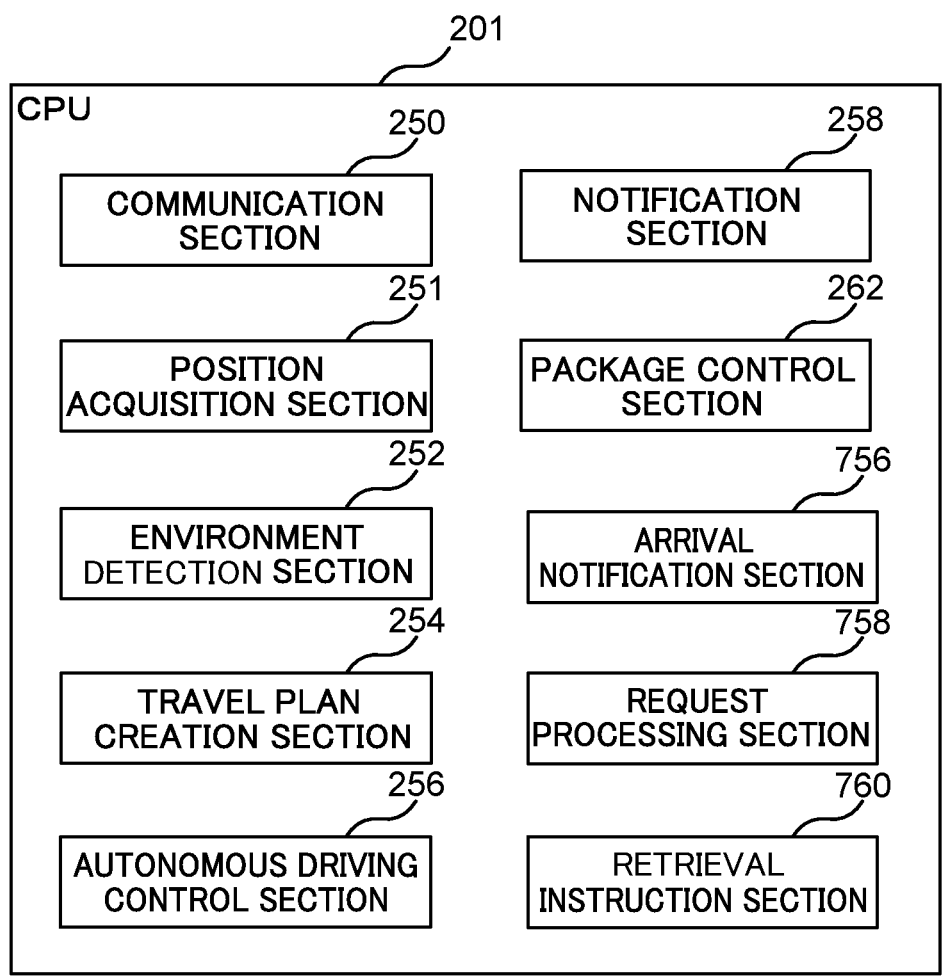
FIG. 21 is a block diagram illustrating an example of functional configuration of a CPU of a vehicle controller in a modified example of the first exemplary embodiment.

Note that in the present exemplary embodiment, the processing server 14 transmits the arrival information to the smartphone 16 (step S13), acquires the request information from the smartphone 16 (step S18), and transmits the position information, package information, destination information, and instruction information to the drone 50 (steps S19 to S21). However, as illustrated in FIG. 21, as a modified example of the present exemplary embodiment, the functionality of the processing server 14 may be included in the vehicle 12. In such cases, the CPU 201 includes the communication section 250, the position acquisition section 251, the environment detection section 252, the travel plan creation section 254, the autonomous driving control section 256, the notification section 258, the package control section 262, the arrival notification section 756, the request processing section 758, and the retrieval instruction section 760. Note that the functionality of the position information acquisition section 752 included in the processing server 14 may be implemented by the position acquisition section 251. In this modified example, the vehicle 12 (more specifically, the CPU 201) transmits the arrival information to the smartphone 16, acquires the request information from the smartphone 16, and transmits the position information, the package information, the destination information, and the instruction information to the drone 50 to obtain similar advantageous effects to those of the present exemplary embodiment.

Moreover, in the vehicle 12 of the present exemplary embodiment, in a case in which plural delivery sites D are present, configuration is made such that each drone 50 creates a travel plan based on its movement distance from the corresponding delivery site D to the vehicle 12. Accordingly, the delivery system 10 of the present exemplary embodiment is capable of achieving efficient utilization of the respective drones 50 in a case in which plural drones 50 move to the vehicle 12, collect packages P, and return to their delivery sites D.

Second Exemplary Embodiment

In the vehicle 12 of the first exemplary embodiment, the hinged door 20B is opened when a drone 50 that has flown up can be detected by the camera. However, in a second exemplary embodiment, configuration is made such that the hinged door 20B can be opened when a drone 50 has been authenticated by the vehicle 12. Explanation follows regarding the points that differ from the first exemplary embodiment. Note that configurations corresponding to those of the first exemplary embodiment are allocated the same reference numerals, and explanation thereof is omitted.

The drone 50 of the present exemplary embodiment is configured capable of displaying a unique package number of the package P on the LED display 540. In the vehicle 12, the functionality of the package control section 262 of the controller 200 is different from that of the first exemplary embodiment. Specifically, the package control section 262 serving as a determination and control section compares the package number displayed on the LED display 540 with the package number of the package P stored in the vehicle 12, and opens the hinged door 20B in a case in which the package numbers match.

Next, explanation follows regarding a flow of second opening processing in the vehicle 12 to open the hinged door 20B to allow the drone 50 access to the package P.

Figure 14:
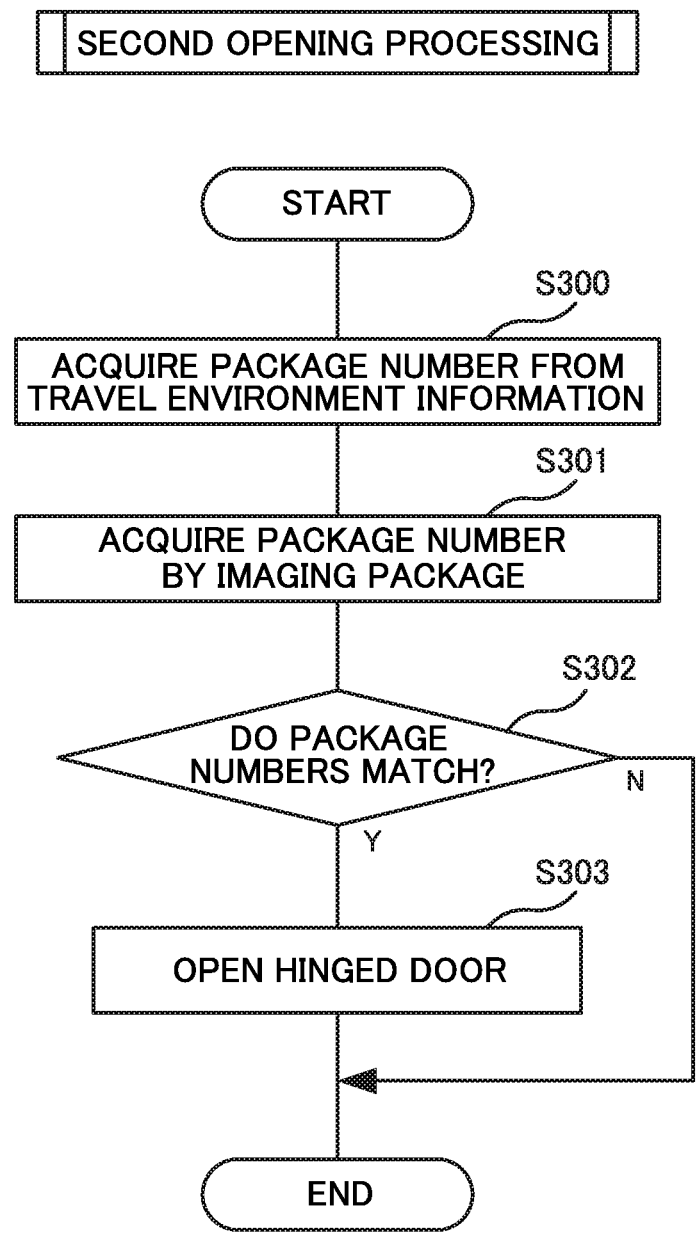
FIG. 14 is a flowchart illustrating an example of a flow of second opening processing performed by a vehicle of a second exemplary embodiment.

At step S300 in FIG. 14, the CPU 201 acquires the travel environment information. The package number displayed on the LED display 540 is acquired as the travel environment information. Processing then proceeds to step S301.

At step S301, the CPU 201 acquires the package number from the package P stored in the cargo hold 22 or the sorting room 24 for the specific user C. Specifically, the CPU 201 images the package P using a camera provided in the cargo hold 22 or the sorting room 24 to acquire the package number. Processing then proceeds to step S302.

At step S302, the CPU 201 determines whether or not the package number displayed on the drone 50 and the package number actually unique to the package P stored in the vehicle 12 match each other. In a case in which the CPU 201 determines that the package numbers match each other, processing proceeds to step S303. In a case in which the CPU 201 determines that the package numbers do not match each other, the second opening processing is ended.

At step S303, the CPU 201 opens the hinged door 20B. The drone 50 is thus able to enter and dock in the drone bay 34. The second opening processing is then ended.

In the delivery system 10 of the present exemplary embodiment, the vehicle 12 authenticates the drone 50 when retrieving the package P from the vehicle 12, enabling the package P to be suppressed from being taken away by another drone 50.

Third Exemplary Embodiment

In the second exemplary embodiment, authentication of the drone 50 is performed by the vehicle 12. However, in a third exemplary embodiment, authentication of the vehicle 12 is performed by the drone 50. Explanation follows regarding points that differ from the first and second exemplary embodiments. Configurations corresponding to those of the first and second exemplary embodiments are allocated the same reference numerals, and explanation thereof is omitted.

A drone 50 of the present exemplary embodiment is provided with a camera 530, serving as an imaging device as described above. The functional configuration of the CPU 501 of the controller 500 of the drone 50 differs from those of the other exemplary embodiments.

Figure 15:
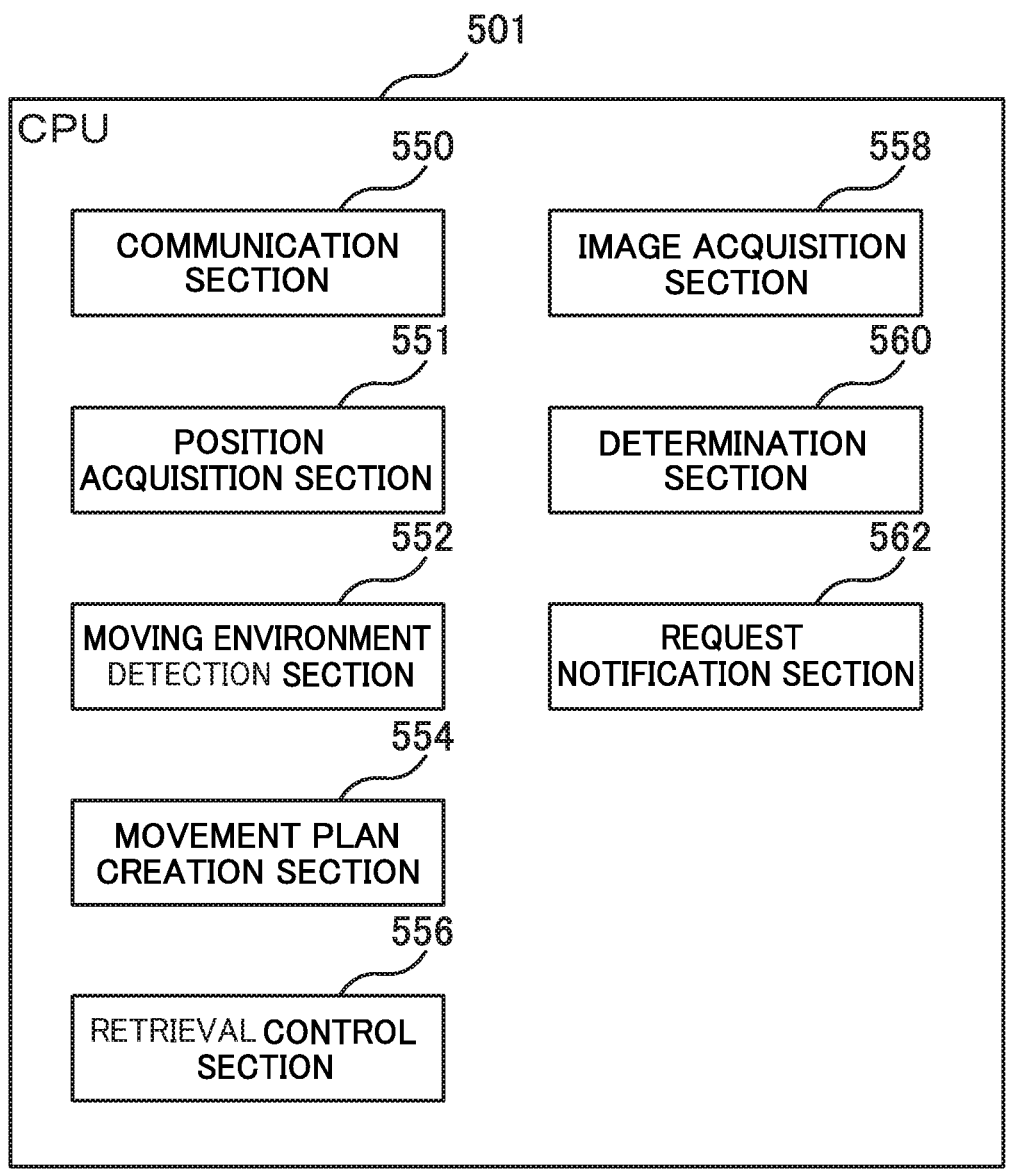
FIG. 15 is a block diagram illustrating an example of functional configuration of a CPU of a drone controller in a third exemplary embodiment.

FIG. 15 is a block diagram illustrating functional configuration of the CPU 501 of the present exemplary embodiment. As illustrated in FIG. 15, the CPU 501 includes the communication section 550, the position acquisition section 551, the moving environment detection section 552, the movement plan creation section 554, and the retrieval control section 556, as well as an image acquisition section 558, a determination section 560, and a request notification section 562.

The image acquisition section 558 has a function of acquiring an image captured by the camera 530 via the input/output I/F 506. The camera 530 of the present exemplary embodiment is capable of imaging identification information displayed on the vehicle 12. The identification information corresponds to, for example, registration plates attached to the front and rear of the vehicle 12, or a unique vehicle number applied to the vehicle 12 by the delivery company.

The determination section 560 has a function of determining whether or not identification information received in advance from the processing server 14 matches the identification information imaged by the camera 530.

The request notification section 562 has a function of notifying the vehicle 12 of package request information requesting handover of the package. Specifically, the request notification section 562 transmits the package request information to the vehicle 12 via the communication I/F 705 in a case in which the identification information received in advance from the processing server 14 and the identification information imaged by the camera 530 match each other.

In the vehicle 12, the functionality of the package control section 262 of the controller 200 differs from that in the first and second exemplary embodiments. Specifically, the package control section 262, serving as a connection control section, opens the hinged door 20B in a case in which package request information has been received from the drone 50.

Explanation follows regarding a flow of determination processing executed by the drone 50.

Figure 16:
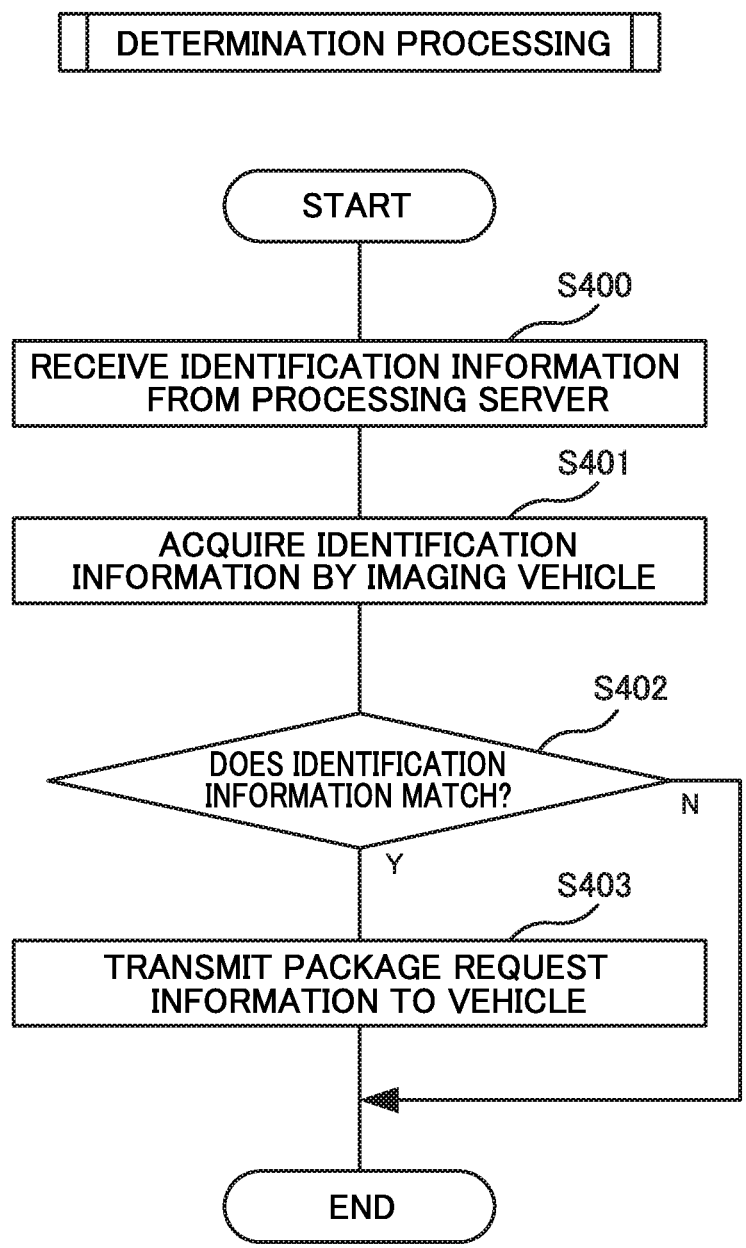
FIG. 16 is a flowchart illustrating an example of a flow of determination processing performed by a drone of the third exemplary embodiment.

At step S400 in FIG. 16, the CPU 501 acquires identification information of the vehicle 12 from which the package P is to be collected from the processing server 14. Processing then proceeds to step S401.

At step S401, the CPU 501 images the vehicle 12 using the camera 530 to acquire identification information displayed on the vehicle 12. Processing then proceeds to step S402.

At step S402, the CPU 501 determines whether or not the identification information received in advance from the processing server 14 and the identification information imaged by the camera 530 match each other. In a case in which the CPU 501 determines that the identification information matches, processing proceeds to step S403. In a case in which the CPU 501 determines that the identification information does not match, the determination processing is ended.

At step S403, the CPU 501 transmits package request information to the vehicle 12. The determination processing is then ended.

Explanation follows regarding a flow of third opening processing executed in the vehicle 12 on receipt of the package request information.

Figure 17:
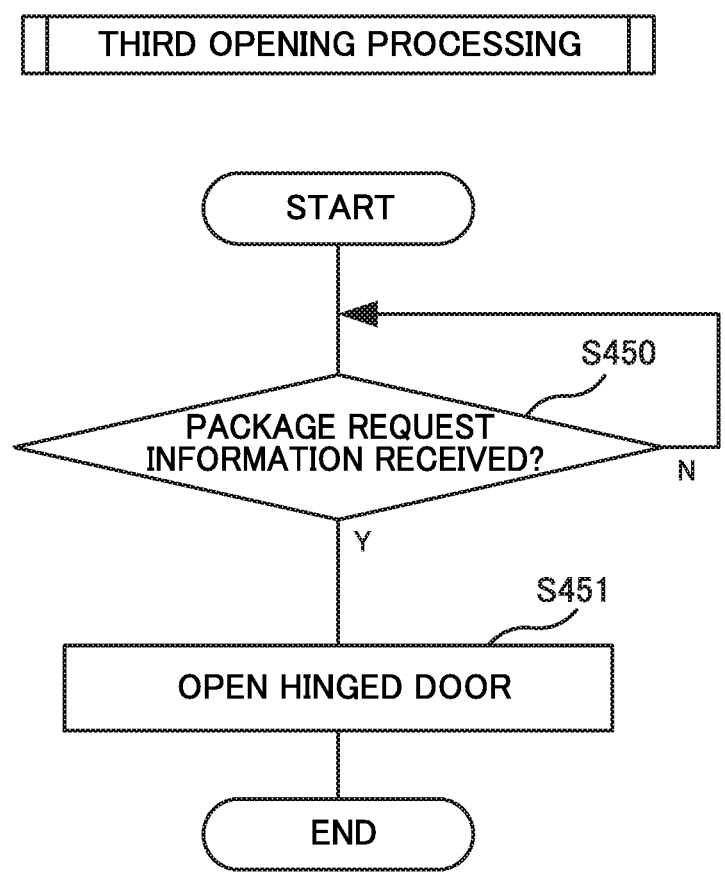
FIG. 17 is a flowchart illustrating an example of a flow of third opening processing performed by a vehicle in the third exemplary embodiment.
Figure 18A:
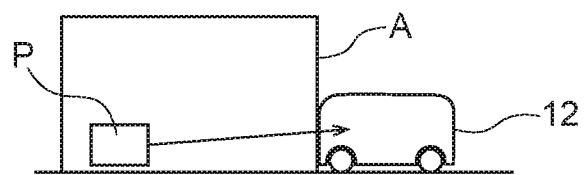
FIG. 18A is a diagram to explain a delivery flow of a package in a fourth exemplary embodiment.
Figure 18B:
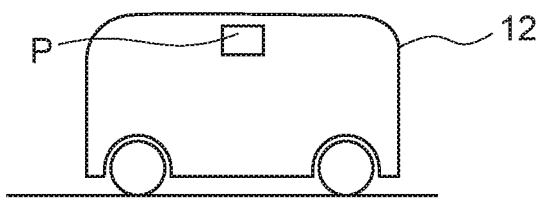
FIG. 18B is a diagram to explain a delivery flow of a package in the fourth exemplary embodiment.
Figure 18C:
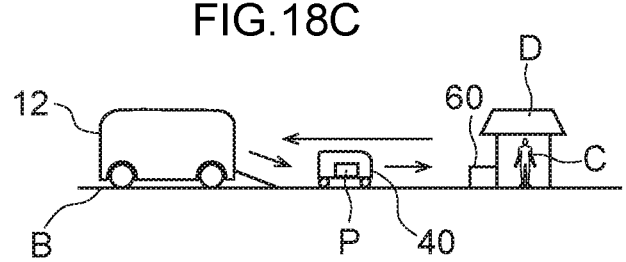
FIG. 18C is a diagram to explain a delivery flow of a package in the fourth exemplary embodiment.
Figure 18D:
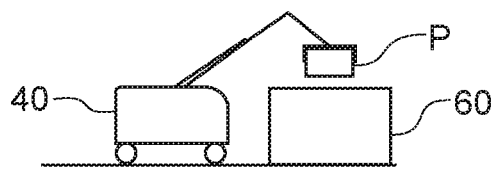
FIG. 18D is a diagram to explain a delivery flow of a package in the fourth exemplary embodiment.

At step S450 in FIG. 17, the CPU 201 determines whether or not package request information has been received. In a case in which package request information has been received, processing proceeds to step S451. In a case in which package request information has not been received, step S450 is repeated.

At step S451, the CPU 201 opens the hinged door 20B. The drone 50 is thus able to enter and dock in the drone bay 34. The third opening processing is then ended.

In the delivery system 10 of the present exemplary embodiment, the drone 50 authenticates the vehicle 12 when retrieving the package P from the vehicle 12. This enables the drone 50 to be suppressed from erroneously retrieving a package P from another vehicle 12.

Fourth Exemplary Embodiment

In the first to the third exemplary embodiments, the drone 50 is applied as the moving body. However, in a fourth exemplary embodiment, the traveling robot 40 is applied as the moving body that is configured to retrieve the package P. Explanation follows regarding points that differ from the first exemplary embodiment. Configurations corresponding to those of the first exemplary embodiment are allocated the same reference numerals, and explanation thereof is omitted.

Out of the configurations illustrated in FIG. 1, a delivery system 10 according to the present exemplary embodiment is configured by the vehicle 12, the traveling robot 40, the processing server 14, and the smartphone 16.

FIG. 18A to FIG. 18D illustrate a flow of delivery of a package P by the delivery system 10 of the present exemplary embodiment. A product purchased by the user C is stored in the vehicle 12 from a distribution center A as the package P (see FIG. 18A), and the vehicle 12 travels toward the delivery site D where the user C resides (see FIG. 18B). When the vehicle 12 arrives at a destination B set in the vicinity of the delivery site D, the traveling robot 40 deployed at the delivery site D travels to the vehicle 12, retrieves the package P from the vehicle 12, and travels back to the delivery site D (see FIG. 18C). The traveling robot 40 then stores the package P in a delivery box 60 (see FIG. 18D). Note that instead of storing the package P in the delivery box 60, the package P may be placed at a predetermined location, or the package P may be handed directly to the user C.

Traveling Robot

In the present exemplary embodiment, an unmanned traveling robot is applied as the moving body. FIG. 19 is a side view illustrating the structure of the traveling robot 40 of the present exemplary embodiment. As illustrated in FIG. 19, the traveling robot 40 is configured including a substantially box shaped vehicle body 42, the storage compartment 44 inside the vehicle body 42 in which the package P is stored, and a cover 46 that closes off an opening 45 in an upper portion of the storage compartment 44.

The cover 46 is supported so as to be capable of moving in a vehicle front-rear direction along rails provided on both vehicle width direction sides of the opening 45. The cover 46 moves toward the vehicle rear from an upper portion of the opening 45 so as to open up the opening 45. The traveling robot 40 further includes a robotic arm 48 to move the package P from the storage compartment 44 to the vehicle exterior.

A GPS device 410 is provided to an upper portion 42A of the vehicle body 42, and an environmental sensor 420 is provided to at least a side portion 42B at the vehicle front. The controller 500, serving as a travel control section, is provided inside the vehicle body 42. The environmental sensor 420 includes a camera, millimeter wave radar, and LIDAR, similarly to the environmental sensors 220 provided to the vehicle 12.

Figure 20:
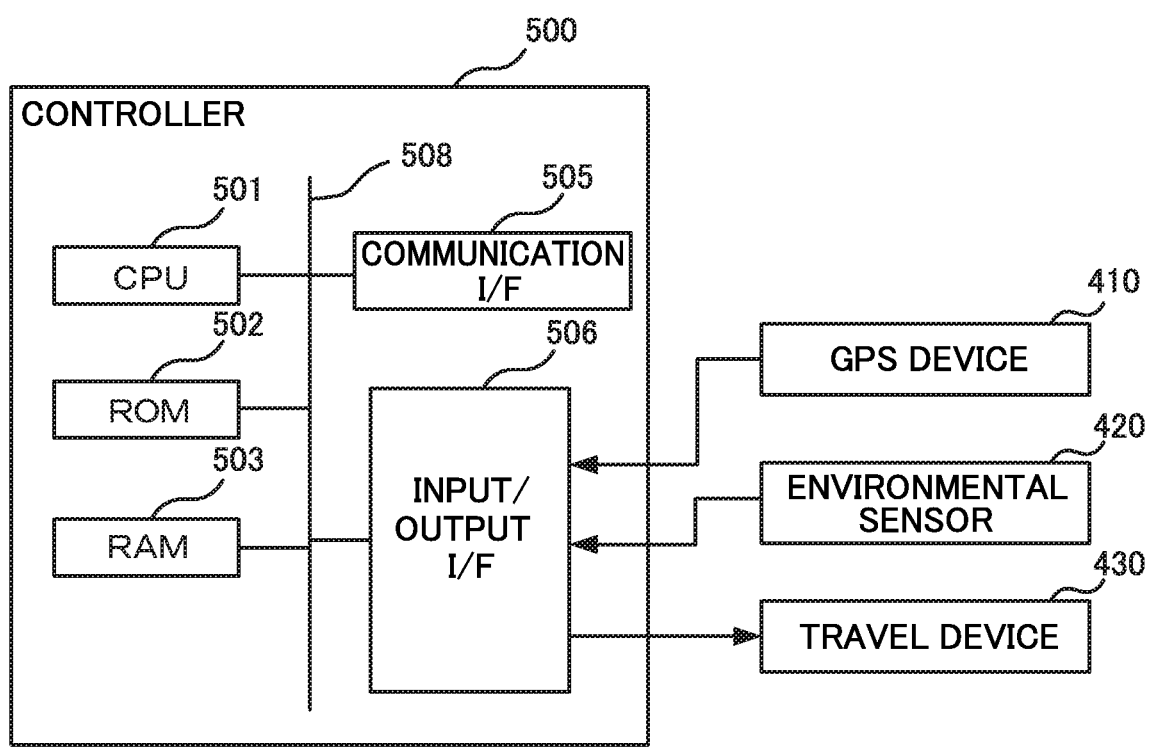
FIG. 20 is a block diagram illustrating a hardware configuration of a traveling robot controller of the fourth exemplary embodiment.

FIG. 20 is a block diagram illustrating a hardware configuration of the traveling robot 40 of the present exemplary embodiment. In addition to the controller 500 described above, the traveling robot 40 also includes the GPS device 410 that acquires a current position of the traveling robot 40, the environmental sensor 420 that performs detection of the environment around the traveling robot 40, and a travel device 430 that performs acceleration, deceleration, and steering of the traveling robot 40.

The controller 500 of the present exemplary embodiment has a similar configuration to the controller 500 of the first exemplary embodiment. The GPS device 410, the environmental sensor 420, and the travel device 430 are connected to the controller 500 of the present exemplary embodiment via the input/output I/F 506. Note that the GPS device 410, the environmental sensor 420, and the travel device 430 may be connected directly to the bus 508.

Functional configuration of the CPU 501 of the present exemplary embodiment is as illustrated in FIG. 8. However, the functionality differs in the following manner.

The position acquisition section 551 has a function of acquiring the current position of the traveling robot 40. The position acquisition section 551 acquires position information from the GPS device 410 via the input/output I/F 506.

The moving environment detection section 552 has a function of perceiving the travel environment around the traveling robot 40. The moving environment detection section 552 acquires the travel environment of the traveling robot 40 from the environmental sensor 420 via the input/output I/F 506 as travel environment information. The "travel environment information" includes the weather, brightness, obstacles, and the like around the traveling robot 40.

The movement plan creation section 554 has a function of creating a travel plan (movement plan) from the delivery site D corresponding to the user C to the vehicle 12 and back to the delivery site D.

The retrieval control section 556 has a function of making the traveling robot 40 travel by operating the travel device 430 according to the created travel plan while taking the travel environment into account. The retrieval control section 556 also has a function of retrieving the package P by opening the cover 46 and operating the robotic arm 48 to move the package P.

The delivery system 10 of the present exemplary embodiment configured as described above performs similar processing to the delivery system 10 of the first exemplary embodiment, and exhibits similar advantageous effects thereto. Similar operation and advantageous effects to those of the respective exemplary embodiments are obtained in cases in which the traveling robot 40 is applied to the delivery system 10 of the second exemplary embodiment or the third exemplary embodiment.

Notes

In each of the exemplary embodiments described above, explanation has been split between cases in which the drone 50 retrieves the package P, and cases in which the traveling robot 40 retrieves the package P. However, there is no limitation thereto. Both moving bodies may retrieve the package P from the vehicle 12 according to the type of moving body (traveling robot 40, drone 50) in the possession of the user C.

In each of the exemplary embodiments described above, explanation has been given of examples in which the traveling robot 40 or the drone 50 is allowed inside the vehicle 12 in which the package P is present as an example of "allowing access to the package P" when handing over the package P from the vehicle 12. However, there is no limitation thereto. "Allowing access to the package P" includes cases in which the package P is taken to the exterior of the vehicle 12 where the traveling robot 40 or the drone 50 is present. For example, in a case in which the drone 50 has been detected by the vehicle 12, the package P may be taken to a roof section of the vehicle body 20 for the package P to be picked up from the vehicle upper side of the vehicle 12. As another example, when the traveling robot 40 has been detected by the vehicle 12, the package P may be unloaded to the exterior of the vehicle 12 using the ramp 23 for the package P to be picked up at the vehicle exterior.

In the first to the third exemplary embodiments, explanation has been given regarding examples in which the drone 50 serves as the moving body. However, there is no limitation thereto, and the moving body may be configured by a radio controlled plane, a radio controlled helicopter, or the like. In the fourth exemplary embodiment, explanation has been given regarding an example in which the traveling robot 40 serves as the moving body. However, there is no limitation thereto, and the moving body may be configured by a ground-based radio controlled car, ambulatory robot, or the like.

The drone 50 of the first to the third exemplary embodiments retrieves the package P at the storage compartment 54 inside the conveyance case 56 provided at a lower end of the drone body 52. However, the retrieve method is not limited thereto. For example, a robotic arm may be provided to a lower section of the drone body 52, and the package P may be picked up by gripping the package P using the robotic arm.

Note that the respective processing executed by the CPUs 201, 501, and 701 of the exemplary embodiments described above reading and executing software (programs) may be executed by various processors other than CPUs. Examples of such processors include Programmable Logic Devices (PLDs) that enable post-manufacture circuit configuration modifications, such as a Field-Programmable Gate Array (FPGA), and processors such as Application Specific Integrated Circuits (ASICs) with custom-designed electrical circuit configurations for execution of specific processing. Moreover, movement processing, determination processing, first opening processing, second opening processing, and third opening processing may be executed by one of such various processors, or may be executed using a combination of two or more processors of the same type or of different types to each other (for example, by plural FPGAs, or by a combination of a CPU and an FPGA). More specific examples of the hardware structures of these various processors include electrical circuits configured by combining circuit devices such as semiconductor devices.

In the exemplary embodiments described above, explanation has been given which the respective programs are provided in a format pre-stored (installed) on a non-transient computer-readable recording medium. For example, the execution program of the vehicle 12 is pre-stored in the ROM 202. Moreover, for example, the execution programs of the drone 50 and the traveling robot 40 are pre-stored in the ROMs 502, and a control program of the processing server 14 is pre-stored in the storage 704. However, there is no limitation thereto, and the respective programs may be provided in a format stored on a non-transient recording medium such as Compact Disc Read Only Memory (CD-ROM), Digital Versatile Disc Read Only Memory (DVD-ROM), or Universal Serial Bus (USB) memory. The programs may also be in a format to be downloaded from an external device over a network.

The processing flows in the exemplary embodiments described above are merely exemplary, and unnecessary steps may be removed, new steps may be added, and the processing sequence may be changed within a range not departing from the spirit of the present disclosure.

Other configurations of the respective controllers, the processing server, the smartphone, and the like in the exemplary embodiments described above are merely exemplary, and may be modified according to circumstances within a range not departing from the spirit of the present disclosure.

What is claimed is:

1. A delivery system comprising a vehicle in which a package addressed to a specific user is stored, and a moving body deployed at a delivery site of the package:
   the moving body including:
   a first memory, and
   a first processor that is connected to the first memory; and
   the first processor being configured to:
   transmit and receive predetermined information, and
   perform control, in a case in which the vehicle is proximate to the delivery site, to move the moving body from the delivery site toward the vehicle, to retrieve the package, and then to move the moving body back to the delivery site.

2. The delivery system of claim 1, wherein the first processor is configured to acquire delivery site information relating to the delivery site and destination information relating to a destination of the vehicle, and to create a movement plan in a case in which the specific user has requested delivery of the package.

3. The delivery system of claim 2, wherein the first processor is configured to move the moving body in a case in which it has been determined that the moving body will arrive at the vehicle after the vehicle has arrived at the destination set in a vicinity of the delivery site based on the movement plan.

4. The delivery system of claim 1, wherein the first processor is configured to turn on a power source to achieve an activated state based on an activation signal received in a case in which the vehicle is proximate to the delivery site.

5. The delivery system of claim 1, wherein:
   the vehicle is an autonomous vehicle;
   the vehicle includes:
   a second memory, and
   a second processor that is connected to the second memory; and
   the second processor is configured to detect surrounding environment information and to create a travel plan.

6. The delivery system of claim 5, wherein in a case in which there are a plurality of delivery sites, a moving body is provided for each of the plurality of delivery sites, the second processor is configured to create the travel plan based on respective movement distances of each moving body from a corresponding delivery site to the vehicle.

7. The delivery system of claim 5, wherein the second processor is configured to allow the moving body access to the package in a case in which presence of the moving body around the vehicle has been detected.

8. The delivery system of claim 5, wherein:
   the moving body includes a display device that displays pre-acquired package information unique to the package; and
   the second processor of the vehicle is configured to allow the moving body access to the package in a case in which package information detected on the display device matches the package information unique to the package.

9. The delivery system of claim 1, wherein:
   the moving body includes an imaging device configured to image identification information of the vehicle;
   the first processor of the moving body is configured to:
   determine whether or not identification information received in advance matches the identification information imaged by the imaging device, and
   transmit request information to the vehicle to request handover of the package in a case in which the identification information received in advance and the imaged identification information match each other; and
   the second processor of the vehicle is configured to allow the moving body access to the package in a case in which the request information has been received.

10. The delivery system of claim 1, wherein:
the moving body is a flying moving body; and
the first processor is configured to control the flying moving body so as to fly between the delivery site and the vehicle storing the package to be retrieved.

11. The delivery system of claim 1, wherein:
the vehicle includes:
   a second memory, and
   a second processor that is connected to the second memory; and
the second processor is configured to:
   perform communication between the moving body and a terminal of the specific user,
   acquire request information requesting delivery of the package from the terminal, and
   in a case in which the request information has been acquired and the vehicle is proximate to the delivery site, notify the moving body deployed at the delivery site of position information of the vehicle and of instruction information instructing retrieval of the package from the vehicle.

12. A processing server comprising:
memory; and
a processor that is connected to the memory, the processor being configured to:
   communicate with a vehicle delivering a package to a specific user and with a terminal of the specific user,
   acquire position information of the vehicle from the vehicle in which the package is stored;
   acquire request information from the terminal requesting delivery of the package; and
   in a case in which the request information has been acquired and the vehicle corresponding to the position information is proximate to a delivery site corresponding to the specific user, notify a moving body deployed at the delivery site of the position information of the vehicle and of instruction information instructing retrieval of the package from the vehicle.

13. The processing server of claim 12, wherein the processor is further configured to:
   notify the terminal of the specific user of arrival information relating to arrival of the package in a case in which the vehicle corresponding to the position information is proximate to the delivery site; and
   transmit the position information and the instruction information to the moving body in a case in which the request information has been acquired from the terminal.

* * * * *